(12) United States Patent
Grossmann et al.

(10) Patent No.: US 12,237,898 B2
(45) Date of Patent: Feb. 25, 2025

(54) THREE COMPONENT CODEBOOK BASED CSI REPORTING

(71) Applicant: Fraunhofer-Gesellschaft zur Förderung der angewandten Forschung e.V., Munich (DE)

(72) Inventors: Marcus Grossmann, Erlangen (DE); Markus Landmann, Erlangen (DE); Ramireddy Venkatesh, Erlangen (DE)

(73) Assignee: Fraunhofer-Gesellschaft zur Forderung der angewandten Forschung e.V. (DE)

( * ) Notice: Subject to any disclaimer, the term of this patent is extended or adjusted under 35 U.S.C. 154(b) by 0 days.

(21) Appl. No.: 18/418,436

(22) Filed: Jan. 22, 2024

(65) Prior Publication Data

US 2024/0235639 A1    Jul. 11, 2024

Related U.S. Application Data

(63) Continuation of application No. 17/634,354, filed as application No. PCT/EP2020/072472 on Aug. 11, 2020, now Pat. No. 11,881,919.

(30) Foreign Application Priority Data

Aug. 15, 2019 (EP) ..................................... 19192000
Sep. 24, 2019 (EP) ..................................... 19199327

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0456* (2013.01); *H04L 5/0048* (2013.01); *H04W 72/23* (2023.01)

(58) Field of Classification Search
CPC ..... H04W 72/23; H04W 24/10; H04W 72/21; H04W 72/0446; H04W 72/0453;
(Continued)

(56) References Cited

U.S. PATENT DOCUMENTS

2018/0138950 A1* 5/2018 Rahman ............... H04B 7/0626
2018/0183507 A1* 6/2018 Franz .................. H04B 7/0639
(Continued)

FOREIGN PATENT DOCUMENTS

WO    WO 2018174636 A2    9/2018
WO    WO 2020/0248247 A1    12/2020

OTHER PUBLICATIONS

3GPP TSG-RAN WG1 #94-Bis, Chengdu, China, Oct. 8-12, 2018, Fraunhofer IIS, Fraunhofer HHI, Enhancements on Type-II CSI Reporting—R1-1811088.
(Continued)

*Primary Examiner* — Eva Y Puente
(74) *Attorney, Agent, or Firm* — Burr & Forman LLP

(57) ABSTRACT

A method performed by a UE for providing CSI feedback in the form of CSI reports in a wireless communication system includes receiving, from a gNB, higher layer configurations of one or more downlink reference signals, and CSI report configurations associated with the downlink reference signal configurations, and a radio signal including the downlink reference signals according to the one or more downlink reference signal configurations, the downlink reference signals provided over a configured number of frequency domain resources, time domain resources and one or more ports; determining, for each CSI report, a precoding matrix based on the downlink reference signals and two codebooks, and one or more non-zero combining coefficients for complex combining of one or more spatial domain and delay
(Continued)

domain basis vectors; and reporting to the network node the CSI reports for the CSI report configurations.

14 Claims, 16 Drawing Sheets

(51) Int. Cl.
 *H04L 5/00* (2006.01)
 *H04W 72/23* (2023.01)
(58) Field of Classification Search
 CPC ............. H04W 52/146; H04W 72/232; H04W 72/1268; H04L 5/0053; H04L 5/0048; H04L 5/0057; H04L 1/0026; H04L 5/0094; H04L 5/0051; H04L 5/005; H04L 5/0055; H04B 7/0626; H04B 7/0695; H04B 7/0639; H04B 7/0632; H04B 7/0456; H04B 17/309; H04B 7/088; H04B 7/0617
 USPC ........................................................ 375/267
 See application file for complete search history.

(56) References Cited

U.S. PATENT DOCUMENTS

2018/0316407 A1* 11/2018 Rahman ............... H04B 7/0621
2020/0236506 A1* 7/2020 Kim ...................... H04W 64/00

OTHER PUBLICATIONS

3GPP TSG-RAN WG1 #96, Athens, Greece, Feb. 25-Mar. 1, 2019, Fraunhofer IIS, Fraunhofer HHI, Enhancements on Type-II CSI Reporting—Doppler Approach—R1-1902124.
Extended European Search Report, European Patent No. EP 23209152. 0, Completed Oct. 29, 2024 by Declan Reilly Examiner.
Enhancements on Type-II CSI Reporting, CSI Enhancement for MU-MIMO Support, Fraunhofer IIS et al., 3GPP TSG-RAN WG1 #95, R1-1813130, Spokane, USA, Nov. 12-16, 2018.
Japan Patent Application No. 2022-509080, Office Action Drafted May 28, 2024.

* cited by examiner

Priority 0:

Part 2 CSI subgroup 1 for CSI report 1

Priority 1:

Part 2 CSI subgroup 1 for CSI report 2

⋮

Priority $N_{REP} - 1$:

Part 2 CSI subgroup 1 for CSI report $N_{REP}$

Priority $N_{REP}$:

Part 2 CSI subgroup 2 for CSI report 1

Priority $N_{REP} + 1$:

Part 2 CSI subgroup 2 for CSI report 2

⋮

Priority $2N_{REP} - 1$:

Part 2 CSI subgroup 2 for CSI report $N_{REP}$

⋮

Priority $(T - 1)N_{REP}$:

Part 2 CSI subgroup $T$ for CSI report 1

Priority $(T - 1)N_{REP} + 1$:

Part 2 CSI subgroup $T$ for CSI report 2

⋮

Priority $TN_{REP} - 1$:

Part 2 CSI subgroup $T$ for CSI report $N_{REP}$

Figure 2

Priority 0:

Part 2 CSI subgroup 1 for CSI report 1

Priority 1:

Part 2 CSI subgroup 2 for CSI report 1

⋮

Priority $T - 1$:

Part 2 CSI subgroup $T$ for CSI report 1

Priority $T + 1$:

Part 2 CSI subgroup 1 for CSI report 2

Priority $T + 2$:

Part 2 CSI subgroup 2 for CSI report 2

⋮

Priority $2T - 1$:

Part 2 CSI subgroup $T$ for CSI report 2

⋮

Priority $T(N_{REP} - 1)$:

Part 2 CSI subgroup 1 for CSI report $N_{REP}$

Priority $T(N_{REP} - 1) + 1$:

Part 2 CSI subgroup 2 for CSI report $N_{REP}$

⋮

Priority $TN_{REP} - 1$:

Part 2 CSI subgroup $T$ for CSI report $N_{REP}$

Figure 3

| Priority 0: |
| --- |
| Part 2 joint CSI subgroup for CSI report 1 to $N_{REP}$ |
| Priority 1: |
| Part 2 CSI subgroup 1 for CSI report 1 |
| ⋮ |
| Priority $T$: |
| Part 2 CSI subgroup $T$ for CSI report 1 |
| Priority $T + 1$: |
| Part 2 CSI subgroup 1 for CSI report 2 |
| Priority $T + 2$: |
| Part 2 CSI subgroup 2 for CSI report 2 |
| ⋮ |
| Priority $2T$: |
| Part 2 CSI subgroup 2 for CSI report 2 |
| ⋮ |
| Priority $T(N_{REP} - 1) + 1$: |
| Part 2 CSI subgroup $T$ for CSI report $N_{REP}$ |
| Priority $T(N_{REP} - 1) + 2$: |
| Part 2 CSI subgroup $T$ for CSI report $N_{REP}$ |
| ⋮ |
| Priority $TN_{REP}$: |
| Part 2 CSI subgroup $T$ for CSI report $N_{REP}$ |

Figure 4

| |
|---|
| Priority 0: <br><br> Part 2 joint CSI subgroup for CSI report 1 to $N_{REP}$ |
| Priority 1: <br><br> Part 2 CSI subgroup 1 for CSI report 1 |
| Priority 2: <br><br> Part 2 CSI subgroup 1 for CSI report 2 |
| ⋮ |
| Priority $N_{Rep}$: <br><br> Part 2 CSI subgroup 1 for CSI report $N_{Rep}$ |
| Priority $N_{Rep} + 1$: <br><br> Part 2 CSI subgroup 2 for CSI report 1 |
| Priority $N_{Rep} + 2$: <br><br> Part 2 CSI subgroup 2 for CSI report 2 |
| ⋮ |
| Priority $2N_{REP}$: <br><br> Part 2 CSI subgroup 2 for CSI report $N_{REP}$ |
| ⋮ |
| Priority $(T-1)N_{REP} + 1$: <br><br> Part 2 CSI subgroup $T$ for CSI report 1 |
| Priority $(T-1)N_{REP} + 2$: <br><br> Part 2 CSI subgroup $T$ for CSI report 2 |
| ⋮ |
| Priority $TN_{REP}$: <br><br> Part 2 CSI subgroup $T$ for CSI report $N_{REP}$ |

Figure 5

| Priority 0: |||||||
|---|---|---|---|---|---|---|
| Part 2 joint CSI subgroup for CSI report 1 to $N_{REP}$ |||||||
| SD basis indicator | DD basis indicator(s) for RI layers | SCI(s) for RI layers | Pol. specific amplitudes for RI layers | Starting index of the window parameter $M_{init}$ | Bitmaps for the RI layers | First fraction of phase and amplitude values of combining coefficients for CSI report 1 to $N_{REP}$ |

| Priority $n$: |
|---|
| Part 2 CSI subgroup 1 for CSI report $n$ |
| Second fraction of phase and amplitude values of combining coefficients |

Figure 6

| Priority 0: ||||||
|---|---|---|---|---|---|
| Part 2 joint CSI subgroup for CSI report 1 to $N_{REP}$ ||||||
| SD basis indicator | DD basis indicator(s) for RI layers | SCI(s) for RI layers | Pol. specific amplitudes for RI layers | Starting index of the window parameter $M_{init}$ | Bitmaps for the RI layers |

| Priority $n$: |
|---|
| Part 2 CSI subgroup 1 for CSI report $n$ |
| First fraction of phase and amplitude values of combining coefficients |

| Priority $n'$ ($n' > n$): |
|---|
| Part 2 CSI subgroup $T$ for CSI report $n$ |
| Last fraction of phase and amplitude values of combining coefficients |

Figure 7

| Priority $n$: | | | | | |
|---|---|---|---|---|---|
| Part 2 CSI subgroup 1 for CSI report n | | | | | |
| SD basis indicator | DD basis indicator(s) for RI layers | SCI(s) for RI layers | Pol. specific amplitudes for RI layers | Starting index of the window parameter $M_{init}$ | First fraction of phase and amplitude values of combining coefficients |

⋮

| Priority $n'(n'>n)$: |
|---|
| Part 2 CSI subgroup 2 for CSI report $n$ |
| Second fraction of phase and amplitude values of combining coefficients |

Figure 8

| Priority *n*: |||||
|---|---|---|---|---|
| Part 2 CSI subgroup 1 for CSI report t |||||
| Ordering with respect to increasing DD index |||||
| Segment 0 || Segment 1 || …….. |
| Sub-bitmap 1 (associated to all SD basis vectors and first DD basis vector for the RI layers) | Phase and amplitude information of all combining coefficients associated with sub-bitmap 1 | Sub-bitmap 2 (associated to all SD basis vectors and second DD basis vector for the RI layers) | Phase and amplitude information of all combining coefficients associated with sub-bitmap 2 | …….. |

| Priority *n' (N'>n)*: |||||
|---|---|---|---|---|
| Part 2 CSI subgroup *2* for CSI report t |||||
| Ordering with respect to increasing DD index |||||
| Segment k || Segment k+1 || …….. |
| Sub-bitmap k (associated to all SD basis vectors and k-th DD basis vector for the RI layers) | Phase and amplitude information of all combining coefficients associated with sub-bitmap k | Sub-bitmap k+1 (associated to all SD basis vectors and (k+1)-th DD basis vector for the RI layers) | Phase and amplitude information of all combining coefficients associated with sub-bitmap k+1 | …….. |

Figure 9

| Ordering with respect to increasing layer index | | | | |
|---|---|---|---|---|
| Segment $k$ | | | | |
| Sub-segment $k_1$ | | | Sub-segment $k_{RI}$ | |
| Sub-bitmap $k_1$ (associated to all SD basis vectors and $k$-th DD basis vector of the first layer) | Phase and amplitude information of all combining coefficients associated with sub-bitmap $k_1$ | ... | Sub-bitmap $k_{RI}$ (associated to all SD basis vectors and $k$-th DD basis vector of $RI$-th layer) | Phase and amplitude information of all combining coefficients associated with sub-bitmap $k_{RI}$ |

Figure 10

| Ordering with respect to increasing SD index | | | | |
|---|---|---|---|---|
| Sub-segment $k_r$ | | | | |
| Sub-segment $k_{r,1}$ | | | Sub-segment $k_{r,2U}$ | |
| Bit $k_{r,1}$ (associated to the first SD basis vector and $k$-th DD basis vector of the $r$-layer) | Phase and amplitude information of the combining coefficient associated with sub-bitmap $k_{r,1}$ | ... | Bit $k_{r,2U}$ (associated to the last SD basis vector and $k$-th DD basis vector of $r$-th layer) | Phase and amplitude information of combining coefficient associated with sub-bitmap $k_{r,2U}$ |

Figure 11

| Ordering with respect to increasing layer index | | | |
|---|---|---|---|
| Bitmap of RI layers – size $2UD \times RI$ | | | |
| Segment 1 of size $2UD$ associated with the first layer | Segment 2 of size $2UD$ associated with second layer | ... | Segment RI of size $2UD$ associated with $RI$-th layer |

Figure 12

| Ordering with respect to increasing DD index |   |   |
|---|---|---|
| Bitmap (segment) of size $2UD \times 1$ | | |
| $2U$ bits associated with the first DD basis index | ... | $2U$ bits associated with $D$-th DD basis index |

Figure 13

| Ordering with respect to increasing SD index |   |   |
|---|---|---|
| Bitmap (segment) of size $2UD \times 1$ | | |
| $2D$ bits associated with the first SD basis index | ... | $2D$ bits associated with the $U$-th SD basis index |

Figure 14

| Ordering with respect to increasing SD index |   |   |
|---|---|---|
| Bitmap (segment) of size $2UD \times 1$ | | |
| $D$ bits associated with the first SD basis index | ... | $D$ bits associated with the $2U$-th SD basis index |

Figure 15

| Ordering with respect to increasing DD index |   |   |   |   |
|---|---|---|---|---|
| Bitmap of RI layers of size $2UD \times RI$ | | | | |
| Segment 1 of size $2U \times RI$ associated with the first DD index | ... | Segment $d$ of size $2U \times RI$ associated with $d$-th DD index | ... | Segment $D$ of size $2U \times RI$ associated with $D$-th DD index |

Figure 16

| Ordering with respect to increasing SD index | | |
|---|---|---|
| Segment $d$ of size $2U \times RI$ | | |
| $2 \times RI$ bits associated with the first SD basis index | ... | $2 \times RI$ bits associated with $U$-th SD basis index |

Figure 17

| Ordering with respect to increasing SD index | | |
|---|---|---|
| Segment $d$ of size $2U \times RI$ | | |
| $RI$ bits associated with the first SD basis index | ... | $RI$ bits associated with $2U$-th SD basis index |

Figure 18

| Ordering with respect to increasing layer index | | |
|---|---|---|
| Segment $d$ of size $2U \times RI$ | | |
| $2U$ bits associated with first layer | ... | $2U$ bits associated with $RI$-th layer |

Figure 19

| Amplitude information of the first combining coefficient ($a$ bits) | Phase information of the first combining coefficient ($b$ bits) | ... | Amplitude information of the $X$-th combining coefficient ($a$ bits) | Phase information of the $X$-th combining coefficient ($b$ bits) |
|---|---|---|---|---|

Figure 20

| Xa bits | | | Xb bits | | |
|---|---|---|---|---|---|
| Amplitude information of the first combining coefficient ($a$ bits) | ... | Amplitude information of the $X$-th combining coefficient ($a$ bits) | Phase information of the first combining coefficient ($b$ bits) | ... | Phase information of the $X$-th combining coefficient ($b$ bits) |

Figure 21

| Xb bits | | | Xa bits | | |
|---|---|---|---|---|---|
| Phase information of the first combining coefficient (b bits) | | Phase information of the $X$-th combining coefficient ($b$ bits) | Amplitude information of the first combining coefficient ($a$ bits) | | Amplitude information of the $X$-th combining coefficient ($a$ bits) |

Figure 22

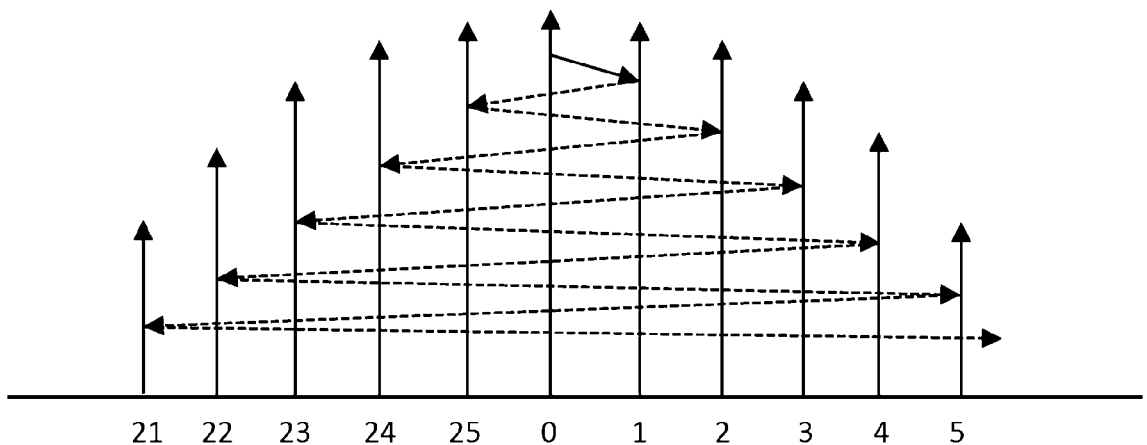

Figure 23

THREE COMPONENT CODEBOOK BASED CSI REPORTING

CROSS-REFERENCE TO RELATED APPLICATION

This application is a Continuation of Non-Provisional application Ser. No. 17/634,354, filed Feb. 10, 2022, which is a national stage application, filed under 35 U.S.C. § 371, of International Patent Application No. PCT/EP2020/072472 filed on Aug. 11, 2020, European Patent Application No. 19192000.8, filed Aug. 15, 2019, and European Patent Application No. 19199327.8 filed on Sep. 24, 2019, which are incorporated by reference herein in their entirety.

TECHNICAL FIELD

The present invention relates to the field of wireless communications, and in particular to methods, user equipments, network nodes and computer program products for providing channel state information, CSI, feedback from a user equipment in the form of one or more CSI reports in a wireless communication system.

BACKGROUND

In a wireless communications system, such as New Radio, also called 3GPP Fifth Generation wireless communications system or 5G for short, downlink (DL) and uplink (UL) signals convey data signals, control signals comprising DL control information (DCI) and/or uplink control information (UCI), and a number of reference signals (RSs) used for different purposes. A radio network node or a radio base station or a gNodeB (or gNB or gNB/TRP (Transmit Reception Point)) transmits data and DCI through the so-called physical downlink shared channel (PDSCH) and the physical downlink control channel (PDCCH), respectively.

A UE transmits data and UCI through the so-called physical uplink shared channel (PUSCH) and physical uplink control channel (PUCCH), respectively. Moreover, the DL or UL signal(s) of the gNB respectively the user equipment, UE or a radio device, may contain one or multiple types of RSs including a channel state information RS (CSI-RS), a demodulation RS (DM-RS), and a sounding RS (SRS). The CSI-RS (SRS) is transmitted over a DL (UL) system bandwidth part and used at the UE (gNB) for CSI acquisition. The DM-RS is transmitted only in a bandwidth part of the respective PDSCH/PUSCH and used by the UE/gNB for data demodulation.

One of many key feature of 5G is the use of multi-input multi-output (MIMO) transmission schemes to achieve high system throughput compared to previous generations of mobile systems. MIMO transmission generally demands the availability of accurate CSI used at the gNB for a signal precoding using a precoding matrix of the data and control information. The current third Generation Partnership Project Release 15 specification (3GPP Rel. 15) therefore provides a comprehensive framework for CSI reporting. The CSI is acquired in a first step at the UE based on received CSI-RS signals transmitted by the gNB. The UE determines in a second step based on the estimated channel matrix a precoding matrix from a predefined set of matrices called 'codebook'. The selected precoding matrix is reported in a third step in the form of a precoding matrix identifier (PMI) and rank identifier (RI) to the gNB.

3GPP Rel.-15 Dual-Stage Precoding and CSI Reporting

In the current Rel.-15 NR specification, there exist two types (Type-I and Type-II) for CSI reporting, where both types rely on a dual-stage, i.e., two components, $W_1W_2$ codebook. The first component, or the so-called first stage precoder, $W_1$, is used to select a number of beam vectors and, if configured, the rotation oversampling factors from a Discrete Fourier Transform-based (DFT-based) matrix which is also called the spatial codebook. The spatial codebook comprises an DFT- or oversampled DFT matrix of dimension $N_1N_2 \times N_1O_1N_2O_2$, where $O_1$ and $O_2$ denote the oversampling factors with respect to the first and second dimension of the codebook, respectively. The DFT vectors in the codebook are grouped into $(q_1, q_2)$, $0 \le q_1 \le O_1-1$, $0 \le q_2 \le O_2-1$ subgroups, where each subgroup contains $N_1N_2$ DFT vectors, and the parameters $q_1$ and $q_2$ are denoted as the rotation oversampling factors. The second component, or the so-called second stage precoder, $W_2$, is used to combine the selected beam vectors.

Assuming a rank-R transmission and a dual-polarized antenna array at the gNB with configuration $(N_1, N_2, 2)$, the Rel.-15 double-stage precoder disclosed in [1] for the s-th subband and r-th transmission layer is given by $$\begin{aligned}W^{(r)}(s) &= W_1 w_2^{(r)}(s) \\ &= W_1 F_A \hat{w}_2^{(r)}(s)\end{aligned} \quad (1)$$

where the precoder matrix $W^{(r)}(s)$ has $2N_1N_2$ rows corresponding to the number of antenna ports, and S columns for the reporting subbands/PRBs. The matrix $W_1 \in \mathbb{C}^{PN_1N_2 \times 2U}$ is the wideband first-stage precoder containing 2U spatial beams for both polarizations, which are identical for all S subbands, and $F_A$ is a diagonal matrix containing 2U wideband amplitudes associated with the 2U spatial beams, and $w_2^{(r)}(s)$ is the second-stage precoder containing 2U subband, subband amplitude and phase, complex frequency-domain combining-coefficients associated with the 2U spatial beams for the s-th subband.

For the 3GPP Rel.-15 dual-stage Type-II CSI reporting, the second stage precoder, $W_2$ is calculated on a subband basis such that the number of columns of $W_2=[w_2^{(r)}(0) \ldots w_2^{(r)}(s) \ldots w_2^{(r)}((S-1))]$ depends on the number of configured subbands. Here, a subband refers to a group of adjacent physical resource blocks (PRBs). One major drawback of the Type-II CSI feedback is the large feedback overhead for reporting the combining coefficients on a subband basis. The feedback overhead increases approximately linearly with the number of subbands, and becomes considerably large for large numbers of subbands. To overcome the high feedback overhead of the Rel.-15 Type-II CSI reporting scheme, it has recently been decided in 3GPP RAN #81 [2] (3GPP radio access network (RAN) 3GPP RAN #81) to study feedback compression schemes for the second stage precoder $W_2$. In several contributions [3]-[4], it has been demonstrated that the number of beam-combining coefficients in $W_2$ may be drastically reduced when transforming $W_2$ using a small set of DFT basis vectors into the delay domain. The corresponding three-stage precoder relies on a three-stage, i.e., three components, $W_1 W_2^{(r)} W_3^{(r)}$ codebook. The first component, represented by matrix $W_1$, is identical to the Rel.-15 NR component, independent of the layer (r), and contains a number of spatial domain (SD) basis vectors selected from a spatial codebook. The second component, represented by matrix $W_3^{(r)}$, is layer-dependent and used to select a number of delay domain (DD) basis vectors from a Discrete Fourier Transform-based (DFT-based) matrix which is also called the delay codebook. The component, represented by matrix $W_2^{(r)}$, is third layer-dependent and contains a number of combining coefficients that are used to combine the selected SD basis vectors and DD basis vectors from the spatial and delay codebooks, respectively.

Assuming a rank-R transmission the three-component precoder matrix or CSI matrix for a configured $2N_1N_2$ antenna/DL-RS ports and configured $N_3$ subbands is represented for the first polarization of the antenna ports and r-th transmission layer as $$W^{(r,1)} = \alpha^{(r,1)} \sum_{u=0}^{U-1} b_u \sum_{d=0}^{D-1} \gamma_{1,u,d}^{(r)} d_d^{(r)H} \qquad (2)$$

and for the second polarization of the antenna ports and r-th transmission layer as $$W^{(r,2)} = \alpha^{(r,2)} \sum_{u=0}^{U-1} b_u \sum_{d=0}^{D-1} \gamma_{2,u,d}^{(r)} d_d^{(r)H},$$

where $b_u$ (u=0, ..., U−1) represents the u-th SD basis vector selected from the spatial codebook, $d_d^{(r)}$ (d=0, ..., D−1) is the d-th DD basis vector associated with the r-th layer selected from the delay codebook, $\gamma_{p, u, d}^{(r)}$ is the complex delay-domain combining coefficient associated with the u-th SD basis vector, d-th DD basis vector and p-th polarization, U represents the number of configured SD basis vectors, D represents the number of configured DD basis vectors, and $\alpha^{(l, p)}$ is a normalizing scalar.

A major advantage of the three-component CSI reporting scheme in equation (2) is that the feedback overhead for reporting the combining coefficient of the precoder matrix or CSI matrix is no longer dependent on the number of configured frequency domain subbands, i.e., it is independent from the system bandwidth. Moreover, the feedback overhead and the performance of the precoder matrix or CSI matrix can be controlled by the gNB by configuring to the UE a maximum number of non-zero combining coefficients, K, per layer, or all layers, that can be contained in the third component, $W_2^{(r)}$, and are reported by the UE. As only the amplitude and phase information of non-zero combining coefficients are reported, an indicator such as a bitmap is required that indicates which of the 2UD coefficients per layer are selected and reported by the UE. According to [5], the selected non-zero coefficients of the r-th layer are indicated by a bitmap, where each bit in the bitmap is associated with a polarization index (p∈ {1,2}), an SD basis index (0≤u≤U−1) and DD basis index (0≤d≤D−1). A "1" in the bitmap indicates that the combining coefficient associated with the polarization index p, SD basis index u, and DD basis index d is non-zero, selected and reported by the UE. A "0" in the bitmap indicates that the combining coefficient associated with the polarization index p, SD basis index u, and DD basis index d is zero, and hence not reported by the UE.

According to [6], the strongest combining coefficient per layer is normalized to 1 and not reported. In order to indicate which of the 2UD coefficients of a layer is the strongest combining coefficient, a strongest coefficient indicator (SCI) is reported per layer by the UE.

According to [6], the non-zero combining coefficients $\gamma_{p, u, d}^{(r)}$ (contained in $W_2^{(r)}$ are quantized as follows:

$$\gamma_{p,u,d}^{(r)} = P_{ref}^{(r,p)} a_{p,u,d}^{(r)} e^{-i\theta_{p,u,d}^{(r)}},$$

where the amplitude of the combining coefficient $\gamma_{p, u, d}^{(r)}$ is given by two amplitudes, the first and the second amplitudes denoted by $P_{ref}^{(r, p)}$ and $a_{p, u, d}^{(r)}$, respectively. Here, $P_{ref}^{(r, p)}$ denotes the polarization reference amplitude defined for each polarization which is common for all amplitude values associated with a polarization p (p=1,2). For the polarization index of the U SD components associated with the SCI, $P_{ref}^{(r, p)}$=1 and not reported. The polarization reference amplitude associated with the other polarization $P_{ref}^{(p')}$, p'≠p is quantized with a' bits. In addition, the amplitude $a_{p, u, d}^{(r)}$, and the phase $\theta_{p, u, d}^{(r)}$ of each combining coefficient $\gamma_{p, u, d}^{(r)}$ is quantized with a bits and b bits, respectively.

Configuration and Reporting of the Three-Component CSI Scheme

For the configuration of the precoder matrix or CSI matrix, a CSI report configuration may be signaled via higher layer (e.g., RRC) from the gNB to the UE, wherein the higher layer CSI report configuration may contain the following information [7]:

A parameter U indicating a number of SD basis vectors to be selected by UE from the spatial codebook for the calculation of $W_1$, A parameter D, or variants thereof, indicating a number of DD basis vectors to be selected by UE per layer from the delay codebook for the calculation of $W_3^{(r)}$, A parameter K, or variants thereof, indicating a maximum number of non-zero coefficients contained in matrix $W_2^{(r)}$, per layer, or all layers, and used by the UE to combine the selected SD basis vectors and DD basis vectors, and A parameter $N_3$ indicating the number of frequency domain subbands of the CSI matrix and the dimension of the DD basis vectors in the delay codebook, and Additional parameter(s) for the configuration of the reporting of the DD basis vectors.

The CSI report may contain at least a rank indicator (RI) indicating the selected number of layers of the CSI matrix, the number of selected number of non-zero combining coefficients across all layers, $K_{NZ}$, and a PMI defining the three components of the CSI matrix, wherein the PMI contains at least the following information [7]:

A spatial domain subset indicator (SD basis indicator) indicating the selected U SD basis vectors and, if configured, the selected oversampling rotation factors from the spatial codebook for the RI layers of the CSI matrix, A delay domain subset indicator (DD basis indicator) indicating per layer the selected DD basis vectors, A strongest coefficient indicator (SCI) per layer indicating the SD basis index, or the SD and DD basis indices, associated with the strongest combining coefficient, which is not reported, Amplitude and phase information associated with the $K_{NZ, r}$ selected non-zero quantized delay domain combining coefficients per layer, A bitmap per layer indicating the SD basis indices and DD basis indices associated with the $K_{NZ, r}$ non-zero coefficients per layer, A polarization specific reference amplitude per layer, and
Possible additional parameter(s) associated with the DD basis subset indication.

UCI Omission for 3GPP Rel.-15 CSI Reporting

UCI omission [1] for PUSCH-based resource allocation and CSI reporting was introduced in 3GPP Rel-15. It allows a UE to drop some parts of one or more CSI report(s) in the case that the PUSCH resource allocation is not sufficient to carry the entire content of the CSI report(s). UCI omission may happen when the base station did not accurately allocate the PUSCH resources when scheduling the CSI report(s). For example, the base station may allocate resources for a rank-1 (RI=1) CSI report, but the UE determines a rank-2 transmission and reports a rank-2 (RI=2) CSI report of which size is larger than the size of the allocated PUSCH resources. In such a case, the UE has to drop a portion of the UCI content. In 3GPP Rel. 15 the dropping is achieved by decomposing the UCI payload associated with the CSI reports into smaller portions, the so-called priority levels, see Table 5.2.3-1 of [1], where priority level 0 has the highest priority, and $N_{REP}$ represents the total number of CSI reports configured to be carried on the PUSCH. Each priority level is associated with a part of a CSI report. The UE drops the CSI portions with lower priority such that the payload size of the CSI reports fits with the PUSCH resource allocation. Moreover, the CSI payload is portioned into two parts: CSI part 1 and CSI part 2. The CSI part 1 contains the RI and an indicator that indicates the size of CSI part 2. The size of CSI part 1 is fixed, whereas the size of CSI part 2 varies depending on the determined RI by the UE and some other factors. Since the gNB needs to know CSI part 1 in order to decode CSI part 2, UCI omission is only performed on CSI part 2.

The CSI part 2 is composed on $2N_{REP}+1$ CSI portions. Here, $2N_{REP}$ CSI portions, the so-called subband PMIs, contain the CSI content(s) associated with the even and odd subbands of the $N_{REP}$ CSI report(s). Moreover, each subband PMI is associated with a priority level, starting from index 1 to $2N_{REP}$. In addition, the first CSI portion which is associated with priority level index 0 contains information for all $2N_{REP}$ subband PMIs, i.e., for the entire CSI reporting band. The motivation behind the Rel. 15 subband-based CSI decomposition and omission method is that in case of omission of a first subband PMI of CSI report n, the gNB may use the CSI content of the reported second subband PMI of CSI report n to estimate the CSI of the omitted first subband PMI by using an interpolation scheme. In this way, a severe degradation of the performance can be avoided as neighbored subbands are typically highly correlated.

SUMMARY

For the known three-component CSI reporting scheme, the 3GPP Rel. 15 UCI omission procedure cannot be reused, since subband-based PMI does not exists and a decomposition of the CSI part 2 into a number of subband PMIs is not possible. Consequently, new UCI omission rules are required.

Note that the three-component CSI reporting scheme, the CSI payload of a CSI report can be controlled by the UE by the number of non-zero coefficients to be reported. In case of UCI omission, the UE may simply reduce the number of non-zero coefficients to be reported for one or more of the CSI reports based on the available PUSCH resources. However, a reduction of the number of non-zero combining coefficients would require a recalculation of the combining coefficients, SD and DD basis vectors of the CSI matrices for the one or more CSI reports, occupying additional UE resources. Such additional UE resources may not be available at the UE. Therefore, the UCI omission scheme should not be require a recalculation of CSI matrices for one or more CSI reports.

For the three-component CSI reporting scheme, the size of the payload of the CSI reports is mainly determined by the bitmaps and the amplitude and phase information of the reported non-zero combining coefficients of the CSI reports.

In this invention, different segmentation schemes for the bitmaps and the amplitude and phase information of the reported non-zero combining coefficients of the CSI reports for the three-component CSI reporting scheme are proposed.

In one solution of this invention, the UCI omission scheme is based on dropping a portion of the amplitude and phase information of the non-zero combining coefficients of a CSI report.

In another solution of this invention, the UCI omission scheme is based on dropping a portion of the amplitude and/or phase information of the non-zero combining coefficients and a portion of the bitmaps that are associated with the dropped combining coefficients.

The present invention proposes a method performed by a user equipment, UE, for providing channel state information, CSI, feedback in the form of one or more CSI reports in a wireless communication system, the method comprising:

receiving, from a network node, gNB, higher layer configuration(s) of one or more downlink reference signals, and one or more CSI report configuration(s) associated with the downlink reference signal configuration(s), and a radio signal via a MIMO channel, the radio signal including the downlink reference signal(s) according to the one or more downlink reference signal configurations, estimating, the downlink MIMO channel based on measurements on the received one or more downlink reference signals, the downlink reference signals provided over a configured number of frequency domain resources, time domain resources and one or more ports, determining, for each CSI report configuration, a precoding matrix based on an estimated channel matrix and two codebooks, the two codebooks including
a spatial codebook comprising one or more spatial domain (SD) basis components of the precoder, and
a delay codebook comprising one or more delay domain (DD) basis components of the precoder,
and one or more non-zero combining coefficients for complex combining of the one or more SD and DD basis vectors, and reporting to the network node, the one or more CSI reports for the one or more CSI report configurations.

Each CSI report contains the selected precoding matrix in the form of a precoding matrix identifier, PMI, and a rank identifier, RI, indicating the transmission rank for the RI layers of the precoding matrix, and each CSI report comprises two parts: CSI part 1 and CSI part 2, where CSI part 1 has a fixed payload size and comprises information indicating the size of the payload of CSI part 2. CSI part 2 comprises at least the amplitude and phase information of the selected non-zero combining coefficients and the bitmaps of all RI layers indicating the non-zero combining coefficients of the CSI report, wherein the bitmap of each layer is segmented into D bit-sequences with respect to the DD basis indices of the selected DD basis vectors. Each bit-sequence comprises $2U \times 1$ bits which are associated with 2U spatial beams, wherein U denotes the number of selected SD basis vectors from the spatial codebook, and each DD basis index is associated with a delay vector from the delay codebook and, wherein the D bit-sequences are ordered with respect to one of two ordering scheme for the $N_3$ DD basis indices, where $N_3$ denotes the number of DD basis indices of the delay codebook, where the $N_3$ DD basis indices are ordered as $$0, 1, N_3 - 1, 2, N_3 - 2, 3, N_3 - 3, 4, N_3 - 4, 5, \ldots$$

according to a first ordering scheme, or where the $N_3$ DD basis indices are ordered as $$0, N_3 - 1, 1, N_3 - 2, 2, N_3 - 3, 3, N_3 - 4, 4, N_3 - 5, 5, \ldots$$

according to a second ordering scheme. The ordering of the amplitude and phase information of the combining coefficients follows the ordering of the bit-sequences of the bitmaps of all RI layers. A portion, or the entirety, of CSI part 2 is available for omission from the CSI report.

According to one proposed aspect of the invention, CSI part 1 contains at least the information on the selected number of non-zero combining coefficients across all RI layers and an indication of the transmission rank for the RI layers of the selected precoding matrix.

It is also proposed that CSI part 2 contains at least the following information for the RI layers of the selected precoding matrix:
- a spatial domain, SD, basis subset indicator, including, if configured, the rotation oversampling factors, indicating the selected SD basis vectors from the spatial codebook,
- one or more delay domain, DD, basis subset indicators indicating the selected DD basis vectors from the delay codebook,
- the phase and amplitude of the selected non-zero delay-domain combining coefficients,
- a strongest coefficient indicator, SCI, indicating the DD and SD vector associated with the strongest coefficient per layer,
- a polarization reference amplitude per layer,
- a bitmap for indicating the non-zero combining coefficients per layer, and
- possible additional parameter(s) associated with the DD basis subset indication.

Another aspect of the invention teaches that the CSI part 2 of the $N_{REP}$ CSI reports can be segmented into $TN_{REP}+1$ CSI subgroups, wherein always T CSI subgroups are associated with a single CSI report, and one CSI subgroup contains information associated with all $N_{REP}$ CSI reports, wherein each CSI subgroup is associated with a priority, priority level.

It is proposed that the CSI subgroup that contains information associated with all $N_{REP}$ CSI reports may have the highest priority, priority level 0, and the remaining $TN_{REP}$ CSI subgroups may be associated with the lower priority levels 1 to $TN_{REP}$, and that the last CSI subgroup $TN_{REP}$ is associated with the lowest priority level $TN_{REP}$.

It is also proposed that the CSI subgroups may have priorities according as follows:
Priority 0: Part 2 joint CSI subgroup for CSI report 1 to $N_{REP}$
Priority 1: Part 2 CSI subgroup 1 for CSI report 1
. . .
Priority T: Part 2 081 subgroup T for 081 report 1
Priority T+1: Part 2 CSI subgroup 1 for CSI report 2
. . .
Priority 2T: Part 2 CSI subgroup T for CSI report 2
. . .
Priority $T(N_{REP}-1)+1$: Part 2 CSI subgroup 1 for CSI report $N_{REP}$
. . .
Priority $TN_{REP}$: Part 2 CSI subgroup T for CSI report $N_{REP}$.

It is proposed that in case of omission, the UE may drop the CSI subgroups with lower priority until the payload size of the CSI reports fits with the resource allocation from the gNB. When omitting a CSI subgroup for a particular priority level, the UE may omit all the CSI content at that priority level.

The parameter T may indicate the number of CSI subgroups per CSI report and may be related to the granularity of the CSI content that is omitted from a CSI report, wherein a high value of T indicates a high granularity and a low value of T indicates a low granularity, and wherein each CSI report is associated only with two CSI subgroups when the parameter T is given by the value of 2.

One proposed aspect of the invention teaches that the first CSI subgroup, called as the joint CSI subgroup, is associated with priority level 0 contains CSI information of all $N_{REP}$ CSI reports, and wherein the joint CSI subgroup contains the information of at least one the following parameters:
- the selected SD basis subset indicator including, if configured, the rotation oversampling factors, and
- the SCI(s) for the RI layers.

It is also proposed that the CSI subgroup with highest priority of a CSI report contains at least the information of the following parameters:
- the selected DD basis subset indicator(s) for the RI layers,
- the polarization reference amplitude value(s) for the RI layers, and
- the bitmap(s) for indicating the $K_{NZ}$ non-zero combining coefficients for the RI layers, and
- possible additional parameter(s) associated with the DD basis subset indication.

One proposed aspect of the invention teaches that the CSI subgroup with highest priority of a CSI report may contain at least the information of the following parameters:
- the selected DD basis subset indicator(s) for the RI layers,
- the polarization reference amplitude value(s) for the RI layers,
- the bitmap(s) for indicating the $K_{NZ}$ non-zero combining coefficients for the RI layers, and
- the window parameter $M_{init}$.

It is also proposed that the corresponding ordered bitmaps for the RI layers may be grouped together to a bitmap of size 2UD×RI and segmented into D segments, wherein each segment has a size of 2U×RI, wherein the d-th segment is associated with the 2U SD components of all RI layers.

It is proposed that bits in a bit-segment associated with the same SD basis index of all layers may be grouped together and sorted with respect to an increasing layer index, and that RI bits associated with a first SD basis index may be grouped together and followed by RI bits associated with a second SD basis index, and so on.

Another aspect of the invention is that the ordering of the DD basis indices per layer according to the second ordering scheme may be realized by the equation:

$$\pi(f) = \min(2 \cdot n_{3,l}^{(f)}, \ 2 \cdot (N_3 - n_{3,l}^{(f)}) - 1)$$

with l=1, 2, . . . , v, and f=0, 1, . . . , D−1, where $n_{3,l}^{(f)}$ is the f-th DD basis index out of D DD basis indices for each layer, and wherein v is the total number of layers.

Yet another aspect of the invention is that the ordering of the bits in the bitmap may be realized by the equation:

$$Pri(l, \ i, \ f) = 2 \cdot U \cdot v \cdot \pi(f) + v \cdot i + l,$$

with $\pi(f)=\min(2 \cdot n_{3,l}^{(f)}, \ 2 \cdot (N_3-n_{3,l}^{(f)})-1)$, with l=1, 2, . . . , v, i=0, 1, . . . , 2U−1, and f=0, 1, . . . , D−1, where v is the total number of layers, U is the number of selected SD basis vectors per polarization and D is the number of DD basis indices.

Another aspect of the invention is that the first segment of a CSI subgroup with highest priority may be associated with DD basis vector index 0.

Another aspect of the invention is that the UE may be configured for a CSI report to perform a cyclic shift operation on the selected combining coefficients and the selected DD basis vectors per layer with respect to the DD basis vector that is associated with the SCI so that the DD basis vector with index 0 is associated with the SCI.

This means that the CSI subgroup with the highest priority per CSI report may contain information of a first fraction of the amplitude and phase values of the selected non-zero delay-domain combining coefficients, and the remaining T−1 CSI subgroups with lower priority may contain the remaining fraction of amplitude and phase values of the CSI report.

It is also proposed that each CSI subgroup with the highest priority and associated with a single CSI report may contain at least a fraction of the bitmaps for the RI layers and the phase and amplitude information of a fraction of the $K_{NZ}$ non-zero combining coefficients.

This means that the CSI subgroup with highest priority may contain:
the v2LD−⌈$K_{NZ}$/2⌉ highest priority elements of the bitmap of RI=v layers,
the ⌈$K_{NZ}$/2⌉−v highest priority amplitude values, and
the ⌈$K_{NZ}$/2⌉−v highest priority phase values.

It is also proposed that each CSI subgroup associated with a single CSI report may contain the amplitude and phase information of the combining coefficients associated with a portion of the bitmaps of the RI layers.

It is proposed that each CSI subgroup with the highest priority associated with a single CSI report may contain at least the fraction of the bitmaps and the information of the combining coefficients associated with the DD basis vector index of the SCI for the RI layers.

It is also possible that each CSI subgroup that has the highest priority and is associated with a single CSI report may contain at least the bitmaps associated with one or more DD basis vector indices, for the RI layers of the precoding matrix indicated in the CSI report, and the CSI subgroup may contain the corresponding amplitude and/or phase information of the combining coefficients associated with the bitmaps.

It is proposed that each CSI subgroup, that contains information of a fraction of the combining coefficients, may contain phase and amplitude values, associated with a maximum of $$\left\lceil \frac{K_{NZ}}{x} \right\rceil,$$

x>1 combining coefficients of a CSI report, and that the remaining CSI subgroups with lower priority may contain the remaining phase and amplitude values, of the CSI report.

It is then proposed that the CSI subgroup that has the highest priority per CSI report may contain ⌈$K_{NZ}$/2⌉−v highest priority amplitude values and ⌈$K_{NZ}$/2⌉−v highest priority phase values, and that the CSI subgroup that has the lowest priority may contain ⌊$K_{NZ}$/2⌋ lowest priority amplitude values and ⌊$K_{NZ}$/2⌋ lowest priority phase values.

Another aspect of the invention proses that the phase and amplitude values of the combining coefficients may be segmented into two CSI subgroups when T=2 and x=2, where the first CSI subgroup contains the phase and amplitude values associated with $$\left\lceil \frac{K_{NZ}}{2} \right\rceil$$

combining coefficients and the second CSI subgroup contains the phase and amplitude associated with the remaining $$K_{NZ} - \left\lceil \frac{K_{NZ}}{2} \right\rceil$$

combining coefficients of a CSI report.

It is proposed that the amplitude and phase information of the combining coefficients in a CSI subgroup may be ordered such that the amplitude information of X combining coefficients (Xa bits) is followed by the phase information of X combining coefficients (Xb bits)

It is then proposed that for the CSI subgroup with highest priority per CSI report, the $$\left(\left\lceil \frac{K_{NZ}}{2} \right\rceil - v\right) \times a$$

highest priority bits associated with the amplitude values may be followed by the (⌈$K_{NZ}$/2⌉−v)×b highest priority bits associated with the phase values, and wherein v is the total number of transmission layers.

It is also possible that for the CSI subgroup with lower priority per CSI report, the (⌊$K_{NZ}$/2⌋)×a highest priority bits associated with the amplitude values are followed by the (⌊$K_{NZ}$/2⌋)×b highest priority bits associated with the phase values, and wherein v is the total number of transmission layers.

The bit-width of the CSI subgroup may be associated with a single CSI report and highest priority may be fixed and given by A+B, where A is the combined bit-width of all components that are contained in the CSI subgroup apart from the number of non-zero combining coefficients, and B is the bit-width associated with the amplitude (a) and phase information (b) of a fraction of the combining coefficients $$\left\lceil \frac{K_{NZ}}{x} \right\rceil.$$

The present invention also relates to a method performed by a network node, gNB, for receiving channel state information, CSI, feedback in the form of one or more CSI reports in a wireless communication system, the method comprising:

sending, to a user equipment, UE, higher layer configuration(s) of one or more downlink reference signals, and one or more CSI report configuration(s) associated with the downlink reference signal configuration(s), and a radio signal via a MIMO channel, the radio signal including the downlink reference signal(s) according to the one or more downlink reference signal configuration(s), receiving, from the UE one or more CSI reports for one or more CSI report configurations, wherein the one or more CSI reports are generated by the UE by:

estimating, the downlink MIMO channel based on measurements on the received one or more downlink reference signals, the downlink reference signals provided over a configured number of frequency domain resources, time domain resources and one or more ports, determining, for each CSI report, a precoding matrix based on the estimated channel and two codebooks, the two codebooks including a spatial codebook comprising one or more spatial domain (SD) basis components of the precoder, and a delay codebook comprising one or more delay domain (DD) basis components of the precoder, and one or more non-zero combining coefficients for complex combining of the one or more SD and DD basis vectors, wherein each CSI report contains the selected precoding matrix in the form of a precoding matrix identifier, PMI, and a rank identifier, RI, indicating the transmission rank for the RI layers of the precoding matrix, and wherein each CSI report comprises two parts: CSI part 1 and CSI part 2, wherein CSI part 1 has a fixed payload size and comprises information indicating the size of the payload of CSI part 2, wherein CSI part 2 comprises at least the amplitude and phase information of the selected non-zero combining coefficients of the CSI report, wherein the bitmap of each layer is segmented into D bit-sequences with respect to the DD basis indices of the selected DD basis vectors, wherein each bit-sequence comprises 2U×1 bits which are associated with 2U spatial beams, wherein U denotes the number of selected SD basis vectors from the spatial codebook, and each DD basis index is associated with a delay vector from the delay codebook and, wherein the D bit-sequences are ordered with respect to one of two ordering scheme for the $N_3$ DD basis indices, where $N_3$ denotes the number of DD basis indices of the delay codebook, where the $N_3$ DD basis indices are ordered as $$0, 1, N_3 - 1, 2, N_3 - 2, 3, N_3 - 3, 4, N_3 - 4, 5, \ldots$$

according to a first ordering scheme, or where the $N_3$ DD basis indices are ordered as $$0, N_3 - 1, 1, N_3 - 2, 2, N_3 - 3, 3, N_3 - 4, 4, N_3 - 5, 5, \ldots$$

according to a second ordering scheme, and wherein the ordering of the amplitude and phase information of the combining coefficients follows the ordering of the bit-sequences of the bitmaps of all RI layers, and wherein a portion, or the entirety, of CSI part 2 is available for omission from the CSI report.

The invention also relates to a user equipment, UE, comprising a processor and a memory, the memory containing computer program code executable by the processor whereby the UE is operative to perform any one of the subject matter of the inventive method performed by a user equipment.

The invention also relates to a network node comprising a processor and a memory, the memory containing computer program code executable by the processor whereby the network node is operative to perform any one of the subject matter of the inventive method performed by a network node.

The invention also relates to a computer program product comprising computer program code, which, when executed by a processor, enables the processor to perform any one of the subject matter of inventive method relating to a user equipment.

The invention also relates to a computer program product comprising computer program code, which, when executed by a processor, enables the processor to perform any one of the subject matter of inventive method relating to a network node.

The invention provides a method through which new UCI omission rules are implemented enabling a UE using the known three-component CSI reporting scheme to make use of an omission procedure without requiring a recalculation of the combining coefficients, SD and DD basis vectors of the CSI matrices for the one or more CSI reports.

BRIEF DESCRIPTION OF THE DRAWINGS

Examples of embodiments and advantages of the embodiments herein are described in more detail with reference to attached drawings in which:

FIG. 2 is an illustration of scheme 1 showing an example CSI part 2 decomposition into a number of CSI subgroups. $N_{REP}$ CSI subgroups with priority level $(t-1)N_{REP}$ to $tN_{REP}-1$ ($1 \leq t \leq T$) are always associated with $N_{REP}$ CSI reports, FIG. 3 is an illustration of scheme 1 showing a Decomposition of CSI part 2 into a number of CSI subgroups. T CSI subgroups with priority level $(n-1)T$ to $nT-1$ ($1 \leq n \leq N_{REP}$) are always associated with a single CSI report, FIG. 4 is an illustration of scheme 2 showing an example of decomposition of CSI part 2 into a number of CSI subgroups. The first CSI subgroup with the highest priority contains information of CSI report 1 to $N_{REP}$. T CSI subgroups with priority level $(n-1)T+1$ to $nT$ ($1 \leq n \leq N_{REP}$) are always associated with a single CSI report, FIG. 5 is an illustration of scheme 2 showing an example of decomposition of CSI part 2 into a number of CSI subgroups. The first CSI subgroup with the highest priority contains information of CSI report 1 to $N_{REP}$. $N_{REP}$ CSI subgroups with priority level $(t-1)N_{REP}+1$ to $tN_{REP}$ ($1 \leq t \leq T$) are always associated with $N_{REP}$ CSI reports, FIG. 6 is an illustration of an example of CSI content contained in the first joint CSI subgroup with priority level 0 and CSI content of the CSI subgroup that has highest priority and is associated with a single CSI report n, FIG. 7 is an illustration of Example of CSI content contained in first joint CSI subgroup with priority level 0 and CSI content of the T CSI subgroups associated with CSI report n, FIG. 8 is an illustration of CSI content of T=2 CSI subgroups with respect to the third method for decomposition scheme 1, FIG. 9 is an illustration of CSI content of first and second CSI subgroup associated for CSI report t, with segmentation into D segments, where D denotes the number of configured delay vectors per layer of the CSI matrix of CSI report t.

FIG. 10 is an illustration of further segmentation of segment k into sub-segments, each sub-segment is associated with all SD components and a DD basis index of a single layer, FIG. 11 is an illustration of segmentation of segment k into $k_{r,\ 2U}$ sub-segments, each sub-segment is associated with all SD components and a DD basis index of a single layer, FIG. 12 is an illustration of segmentation of a bitmap contained in a CSI subgroup into RI segments, each of 2UD bits, FIG. 13 is an illustration of segmentation of bitmap of size 2UD×1 into sub-segments, each of size 2U×1, FIG. 14 is an illustration of segmentation of bitmap of size 2UD×1 into sub-segments, each of size 2D×1, FIG. 15 is an illustration of segmentation of bitmap of size 2UD×1 into sub-segments, each of size D×1, FIG. 16 is an illustration of segmentation of bitmap into D segments, each of size 2U×RI bits, FIG. 17 is an illustration of segmentation of 2U×RI bits segment into sub-segments of 2RI bits each, FIG. 18 is an illustration of segmentation of 2U×RI bits segment into sub-segments of RI bits each, FIG. 19 is an illustration of segmentation of 2U×RI bits into sub-segments of 2U bits each, FIG. 20 is an illustration of amplitude information followed by the phase information of each combining coefficient, FIG. 21 is an illustration of amplitude information of all X combining coefficients followed by the phase information of all X combining coefficients, FIG. 22 is an illustration of phase information of all X combining coefficients followed by the amplitude information of all X combining coefficients, FIG. 23 is a schematic illustration of a first scheme for ordering of DD basis indices.

DETAILED DESCRIPTION

In the following is presented a detailed description of the exemplary embodiments in conjunction with the drawings, in several scenarios, to enable easier understanding of the solution(s) described herein.

Figure 1:
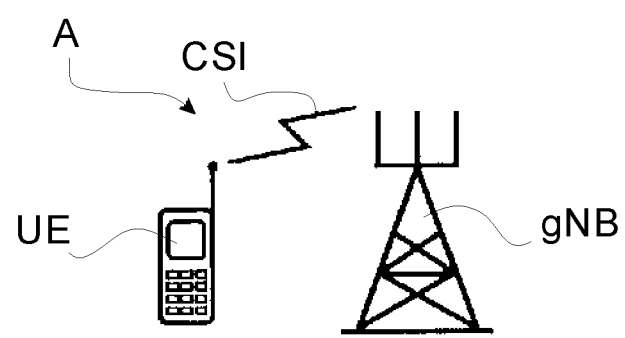
FIG. 1 is a schematic and simplified illustration of a user equipment in communication with a radio base station.

As previously described, in 3GPP new radio system, a UCI omission procedure has been standardized in Rel. 15, which omission procedure cannot be reused, since subband-based PMI does not exist and a decomposition of the CSI part 2 into a number of subband PMIs is not possible. Consequently, new UCI omission rules are required FIG. 1 is a simplified illustration of a method performed by a user equipment, UE, and a radio base station, gNB, for providing channel state information, CSI, feedback in the form of one or more CSI reports in a wireless communication system A, the method comprising:

receiving, from a network node, gNB, higher layer configuration(s) of one or more downlink reference signals, and one or more CSI report configuration(s) associated with the downlink reference signal configuration(s), and a radio signal via a MIMO channel, the radio signal including the downlink reference signal(s) according to the one or more downlink reference signal configurations, estimating, the downlink MIMO channel based on measurements on the received one or more downlink reference signals, the downlink reference signals provided over a configured number of frequency domain resources, time domain resources and one or more ports, determining, for each CSI report configuration, a precoding matrix based on an estimated channel matrix and two codebooks, the two codebooks including
a spatial codebook comprising one or more spatial domain (SD) basis components of the precoder, and
a delay codebook comprising one or more delay domain (DD) basis components of the precoder,
and one or more non-zero combining coefficients for complex combining of the one or more SD and DD basis vectors, and reporting to the network node, the one or more CSI reports for the one or more CSI report configurations.

Each CSI report contains the selected precoding matrix in the form of a precoding matrix identifier, PMI, and a rank identifier, RI, indicating the transmission rank for the RI layers of the precoding matrix, and each CSI report comprises two parts: CSI part 1 and CSI part 2, where CSI part 1 has a fixed payload size and comprises information indicating the size of the payload of CSI part 2. CSI part 2 comprises at least the amplitude and phase information of the selected non-zero combining coefficients of the CSI report, and a portion, or the entirety, of CSI part 2 is available for omission from the CSI report.

In accordance to an embodiment, the UE is configured with $N_{REP}$ CSI reports to be carried on the PUSCH, wherein each CSI report may comprise two parts: CSI part 1 and CSI part 2, where CSI part 1 has a fixed payload size and is used to indicate the size of the payload of CSI part 2. The CSI part 1 may contain at least the information on the number of the combining coefficients across all layers and an indication of the transmission rank (RI) for the RI layers of the selected precoding matrix. The CSI part 2 of a CSI report may contain at least the following information for the RI layers of the selected CSI matrix for the configured antenna ports and subbands:

- a selected SD basis subset indicator including, if configured, the rotation oversampling factors,
- a selected DD basis subset indicator per layer,
- the phase and amplitude of the selected non-zero delay-domain combining coefficients per layer,
- a strongest coefficient indicator (SCI) per layer,
- a polarization reference amplitude per layer,
- a bitmap for indicating the non-zero combining coefficients per layer, and
- possible additional parameter(s) associated with the DD basis subset indication.

Decomposition for CSI Part 2—Scheme 1

In accordance with embodiments, in the first decomposition scheme (Scheme 1), the CSI part 2 of the $N_{REP}$ CSI reports may be segmented into $TN_{REP}$ CSI subgroups, wherein always T CSI subgroups are associated with a single CSI report. Moreover, each CSI subgroup is associated with a priority level, wherein the first subgroup has the highest priority level 0. The remaining $TN_{REP}-1$ CSI subgroups are associated with the lower priority levels 1 to $TN_{REP}-1$. The last CSI subgroup $TN_{REP}-1$ may be associated with the lowest priority level $TN_{REP}-1$.

FIG. 2 illustrates a first example of Scheme 1, where always $N_{REP}$ CSI subgroups with priority level $(t-1)N_{REP}$ to $tN_{REP}-1$ ($1 \le t \le T$) and associated with $N_{REP}$ CSI reports are grouped together.

FIG. 3 illustrates a second example of Scheme 1, where always T CSI subgroups with priority level $(n-1)T$ to $nT-1$ ($1 \le n \le N_{REP}$) and associated with a single CSI report are grouped together The parameter T indicates the number of CSI subgroups per CSI report and is related to the granularity of the CSI content that is omitted from a CSI report. A high value of T indicates a high granularity and a low value of T indicates a low granularity. When the parameter T is given by the value of 2, each CSI report is associated only with two CSI subgroups.

The parameter T indicating the number of CSI subgroups per CSI report may also depend on the CSI report. In one example, the parameter T may be dependent on the rank indicated in the CSI report. For instance, T=2, if the rank indicated in the CSI report is larger than one, RI>1, and T=1 if the rank indicated in the CSI report is one, RI=1. In another example, the parameter T may be dependent on the number of non-zero coefficients $K_{NZ}$ indicated in the CSI report. For instance, T=2, if the number of non-zero coefficients indicated in the CSI report is larger than a specific threshold value, i.e., $K_{NZ} > \tilde{K}_{NZ}$, and T=1 otherwise.

In contrast to Rel. 15 CSI decomposition, where the first CSI subgroup contains information of all $N_{REP}$ CSI reports, each subgroup in the proposed decomposition contains the information associated only with a single CSI report.

In case of UCI omission, the UE drops the CSI subgroups with lower priority until the payload size of the CSI reports fits with the PUSCH resource allocation. When omitting a CSI subgroup for a particular priority level, the UE omits all the CSI content at that priority level.

Decomposition for CSI Part 2—Scheme 2

A drawback of the above CSI decomposition scheme 1, shown in FIG. 2 and FIG. 3, is that when all CSI subgroups associated with a single CSI report are dropped, the complete CSI report is dropped. To avoid the complete dropping of the CSI content of a CSI report, the following embodiment proposes a CSI decomposition that allows the gNB to recalculate partly the CSI matrices for all $N_{REP}$ CSI subgroups even all CSI subgroups are dropped by the UE, except the first CSI subgroup with the highest priority, priority level 0.

In accordance with embodiments, the CSI part 2 of the $N_{REP}$ CSI reports may be segmented into $TN_{REP}+1$ CSI subgroups, wherein always T CSI subgroups are associated with a CSI report. The CSI first subgroup contains information associated with all $N_{REP}$ CSI reports.

Each CSI subgroup is associated with a priority level, wherein the first subgroup has the highest priority level 0. The remaining $TN_{REP}$ CSI subgroups are associated with the lower priority levels 1 to $TN_{REP}$, where the last CSI subgroup $TN_{REP}$ may be associated with the lowest priority level $TN_{REP}$.

The parameter T indicates the number of CSI subgroups per CSI report and is related to the granularity of the CSI content that is omitted from a CSI report. A high value of T indicates a high granularity and a low value of T indicates a low granularity. When the parameter T is given by the value of 2, each CSI report is associated only with two CSI subgroups.

The parameter T indicating the number of CSI subgroups per CSI report may also depend on the CSI report. In one example, the parameter T may be dependent on the rank indicated in the CSI report. For instance, T=2, if the rank indicated in the CSI report is larger than one, RI>1, and T=1 if the rank indicated in the CSI report is one, RI=1. In another example, the parameter T may be dependent on the number of non-zero coefficients $K_{NZ}$ indicated in the CSI report. For instance, T=2, if the number of non-zero coefficients indicated in the CSI report is larger than a specific threshold value, i.e., $K_{NZ} \le \tilde{K}_{NZ}$, and T=1 otherwise.

In case of UCI omission, the UE drops the CSI subgroups with lower priority until the payload size of the CSI reports fits with the PUSCH resource allocation. When omitting a CSI subgroup for a particular priority level, the UE omits all the CSI content at that priority level.

FIG. 4 illustrates a first example of Scheme 2, where always T CSI subgroups with priority level $(n-1)T+1$ to $nT$ ($1 \le n \le N_{REP}$) and associated with a single CSI report are grouped together.

FIG. 5 illustrates a second example of Scheme 2, where always $N_{REP}$ CSI subgroups with priority level $(t-1)N_{REP}+1$ to $tN_{REP}$ ($1 \le t \le T$) and associated with $N_{REP}$ CSI reports are grouped together.

Content of a CSI Subgroup

In accordance with embodiments, when the first CSI subgroup, associated with priority level 0, contains CSI information of all $N_{REP}$ CSI reports, the joint CSI subgroup may contain the information of at least one of the following parameters:
- the selected SD basis subset indicator including, if configured, the rotation oversampling factors,
- the selected DD basis subset indicator(s) for the RI layers,
- the SCI(s) for the RI layers,
- the polarization reference amplitude value(s) for the RI layers,
- the bitmap(s) for indicating the $K_{NZ}$ non-zero combining coefficients for the RI layers, and
- possible additional parameter(s) associated with the DD basis subset indication.

For the segmentation of the phase and amplitude values of the $N_{REP}$ CSI reports for Scheme 2, two partitioning approaches are proposed in the following.

In the first approach, a first portion of the phase and amplitude values of the selected non-zero delay-domain combining coefficients of the $N_{REP}$ CSI reports is contained in the first joint CSI subgroup that has the highest priority. An example of the CSI content of the first joint CSI subgroup and of the CSI subgroup that has the highest priority and is associated with a single CSI report with respect to the first approach is shown in FIG. 6.

In the second approach, the first CSI subgroup that has the highest priority does not contain any phase and amplitude values of the selected non-zero delay-domain combining coefficients for the $N_{REP}$ CSI reports, and only the remaining CSI subgroups contain the information of the non-zero combining coefficients. An example of the CSI content of the first joint CSI subgroup and of the CSI subgroups associated with a single CSI report with respect to the second approach is shown in FIG. 7.

For some examples, T=2, and there are only two groups per CSI report. Group 1, the CSI subgroup that has the highest priority per CSI report other than the joint CSI subgroup, includes the $\lceil K_{NZ}/2 \rceil$-v highest priority amplitude values and $\lceil K_{NZ}/2 \rceil$-v highest priority phase values, and group 2, the CSI subgroup that has the lowest priority per CSI report, contains the $\lfloor K_{NZ}/2 \rfloor$ lowest priority amplitude values and $\lfloor K_{NZ}/2 \rfloor$ lowest priority phase values.

In addition, depending on the CSI content of the first joint CSI subgroup with priority level 0, each CSI subgroup with the highest priority and associated with a single CSI report may contain the following parameters, when not already listed in the first joint CSI subgroup:
- the selected DD basis subset indicator(s) for the RI layers,
- the SCI(s) for the RI layers,
- the polarization reference amplitude value(s) for the RI layers,
- the bitmap(s) for indicating the $K_{NZ}$ non-zero combining coefficients for the RI layers, and
- possible additional parameter(s) associated with the DD basis subset indication.

When UE is configured to decompose the CSI payload of the $N_{REP}$ CSI reports with respect to decomposition scheme 1, and the UE drops up to T−1 CSI subgroups which are associated with a single CSI report, the gNB should still be able to recalculate a part of the CSI matrix for the RI layers based on the remaining non-dropped CSI subgroup(s) associated with that CSI report. In this way, a certain minimum performance may be guaranteed even if a large part of the CSI content of a CSI report is dropped. In order to recalculate a part of the CSI matrix from a CSI report, the gNB needs to know at least some of parameters such as the selected SD and DD basis subset indicator(s), the SCIs, the bitmap(s) and the polarization reference amplitude value(s) for the RI layers, the window parameter $M_{init}$ from the CSI report. This information must be contained for each CSI report in the CSI subgroup that has the highest priority.

In accordance with embodiments, when the CSI payload containing the CSI information of $N_{REP}$ CSI reports is decomposed into a number of CSI subgroups, and each CSI subgroup contains CSI information that is associated only with a single CSI report, the CSI subgroup with highest priority of a CSI report may contain at least the information of the following parameters:
- the selected SD basis subset indicator including, if configured, the rotation oversampling factors,
- the selected DD basis subset indicator(s) for the RI layers,
- the SCI(s) for the RI layers,
- the polarization reference amplitude value(s) for the RI layers,
- the bitmap(s) for indicating the $K_{NZ}$ non-zero combining coefficients for the RI layers,
- possible additional parameter(s) associated with the DD basis subset indication.

For the partitioning of the amplitude and phase values to the CSI subgroups several methods are proposed in the following: In a first method, the CSI subgroup with highest priority per CSI report does not contain any information of the selected non-zero combining coefficients, and only the remaining T−1 CSI subgroups with lower priority contain the amplitude and phase values of the selected non-zero combining coefficients of the CSI report. In a second method, the CSI subgroup with highest priority per CSI report may contain information of a first fraction of the amplitude values of the selected non-zero delay-domain combining coefficients, and the remaining T−1 CSI subgroups with lower priority contain the remaining fraction of amplitude values and all phase values of the CSI report. In a third method, the CSI subgroup with the highest priority per CSI report may contain information of a first fraction of the amplitude and phase values of the selected non-zero delay-domain combining coefficients, and the remaining T−1 CSI subgroups with lower priority contain the remaining fraction of amplitude and phase values of the CSI report.

FIG. 8 shows the CSI content of two CSI subgroups associated with a single CSI report and the corresponding CSI content for each CSI subgroup when partitioning the amplitude and phase values with respect to the third method.

In the case of UCI omission and the CSI decomposition illustrated in FIG. 2, the UE drops firstly the CSI subgroups that contain CSI information related to the non-zero combining coefficients. The remaining CSI subgroup(s) still contain the CSI content that can be used to recalculate partly the CSI matrix indicated in a CSI report. Only in the case that the UE drops all T CSI subgroups associated with a CSI report, the full CSI report is dropped.

In the case of UCI omission and the CSI decomposition illustrated in FIG. 3, the UE drops firstly the CSI subgroups that contain CSI information related to the non-zero delay-domain combining coefficients of the CSI report with lowest priority. In the case that the UE drops all T CSI subgroups associated with the CSI report with lowest priority, the full CSI report is dropped.

In accordance with embodiments, each CSI subgroup that contains information of a fraction of the combining coefficients may contain the amplitude values, or phase and amplitude values associated with a maximum of $$\left\lceil \frac{K_{NZ}}{x} \right\rceil,$$

x>1 combining coefficients of a CSI report. The remaining CSI subgroups with lower priority may contain the remaining amplitude values, or remaining phase and amplitude values of the CSI report.

For examples, T=2 and x=2, and group 1, the CSI subgroup that has the highest priority per CSI report other than the joint CSI subgroup, contains the $\lceil K_{NZ}/2 \rceil$-v highest priority amplitude values and $\lceil K_{NZ}/2 \rceil$-v highest priority phase values, and group 2, the CSI subgroup that has the lower priority per CSI report, contains the $\lfloor K_{NZ}/2 \rfloor$ lowest priority amplitude values and $\lfloor K_{NZ}/2 \rfloor$ lowest priority phase values.

For example, when T=2 and x=2, the phase and amplitude values of the combining coefficients are segmented into two CSI subgroups, where the first CSI subgroup contains the phase and amplitude values associated with $$\left\lceil \frac{K_{NZ}}{2} \right\rceil$$

combining coefficients and the second CSI subgroup contains the phase and amplitude associated with the remaining $$K_{NZ} - \left\lceil \frac{K_{NZ}}{2} \right\rceil$$

combining coefficients of a CSI report.

Segmentation of Bitmaps and Combining Coefficients

The payload of the CSI part 2 is mainly determined by the bitmaps and the phase and amplitude information of the non-zero combining coefficients.

In the proposed scheme 1 the bitmaps for one or more of the RI layers of a CSI report are contained in the first CSI subgroup with the highest priority. Therefore, the payload size of this CSI subgroup can be higher than the payload size of other CSI subgroups. Due to the higher payload size, the UE may drop in some cases the CSI subgroups containing the bitmaps, and hence the full CSI report(s), when the UCI omission rate is high, i.e., when the UE has to drop a large part of the CSI part 2 content.

Similar, in the proposed scheme 2 all bitmaps for the RI layers of the $N_{Rep}$ CSI reports may be contained in the first joint CSI subgroup, or they may be contained per CSI report in the first CSI subgroup that has the highest priority. The payload size of this/these CSI subgroup(s) can be high, and the UE may drop in some cases the CSI subgroup(s) containing the bitmaps for the RI layers, when the UCI omission rate is high.

The following embodiments propose different schemes that reduce the payload size of the CSI subgroup(s) containing the bitmaps, and hence the probability of dropping this/these CSI subgroup(s), by partitioning the bitmaps and the phase and amplitude information of the combining coefficients to different CSI subgroups.

Segmentation with Respect to DD Basis Subset

The first segmentation scheme partitions the bitmaps and the combining coefficients with respect to the number of DD basis vector indices of a CSI report.

When the UE drops a CSI subgroup, the CSI content of the remaining CSI subgroup(s) with higher priority should allow the gNB to partly reconstruct the CSI matrix for the RI layers indicated in the CSI report. To do this, the gNB requires the knowledge of the SD and DD basis indices associated with the strongest combining coefficient per layer. This information can be obtained from the bitmaps and the SCIs for the RI layers. In order to interpret the SCI(s) in a correct way, the first joint CSI subgroup or the first CSI subgroup associated with a single CSI report shall contain at least the fraction of the bitmaps and the information of the combining coefficients associated with the DD basis vector index of the SCI for the RI layers.

In accordance to an embodiment, each CSI subgroup that has the highest priority and is associated with a single CSI report may contain at least the bitmaps associated with all SD components of one or more DD basis vectors, or one or more DD basis vector indices, for the RI layers of the CSI matrix indicated in the CSI report. In addition, the CSI subgroup may contain the corresponding amplitude and/or phase information of the combining coefficients for the RI layers of the CSI matrix.

The bitmaps and the corresponding amplitude and/or phase information of the combining coefficients for the RI layers of the CSI subgroup may be segmented into D' segments, where each segment contains the bitmaps and the corresponding amplitude and/or phase information of the combining coefficients for one or more of the RI layers associated with a single DD basis vector, or a DD basis vector index. Here, D'≤D, and D denotes the configured number of DD basis vectors to the UE for each of the RI layers of the CSI matrix.

In the case that D'<D for the CSI subgroup, the CSI subgroups with lower priority and/or the joint CSI subgroup, if present, may contain the remaining segments associated with the remaining DD basis vectors, DD basis vector indices.

In accordance to an embodiment, each CSI subgroup that has the highest priority and is associated with a single CSI report may contain the fraction of the bitmaps and the information of the combining coefficients associated with all SD components of the DD basis vector index which is associated with the SCI(s) for the RI layers.

Examples for Segmentation

In accordance to an embodiment, the bitmaps and amplitude and/or phase information contained in a CSI subgroup is segmented in one or more segments, wherein each segment may contain a part of the bitmap, sub-bitmap, for each of the RI layers and the associated amplitude and/or phase information of the combining coefficients associated with the sub-bitmap.

For an example configuration of T=2, the CSI content of two CSI subgroups associated with a single CSI report is shown in FIG. 9. As observed from the figure, the sub-bitmap and phase and amplitude information of the combining coefficients associated with all SD components and a DD basis vector index for the RI layers are always packed together into a single segment.

Note that the last segment of a CSI subgroup may contain only a fraction of a sub-bitmap or a fraction of the amplitude and/or phase information associated with that sub-bitmap. In such a case, the remaining fraction of the sub-bitmap or the remaining fraction of the amplitude and/or phase information associated with that sub-bitmap that is not contained in the CSI subgroup may be contained in a CSI subgroup of the same CSI report with lower priority.

In accordance to an embodiment, the bitmaps and amplitude and/or phase information contained in a CSI subgroup are segmented in one or more segments, wherein each segment may contain a part of the bitmap, sub-bitmap, for each of the RI layers and the associated amplitude and/or phase information of the combining coefficients associated with the sub-bitmap.

In one example, the k-th segment is further segmented into RI sub-segments, wherein each sub-segment contains the sub-bitmap associated with all SD components and a DD basis vector index of a single layer and the combining coefficients associated with the sub-bitmap, see FIG. 10.

In one instance, each sub-segment $k_r$ associated with r-th layer may be further segmented into $k_{r,\,2U}$ sub-segments, as shown in FIG. 11. Each sub-segment $k_{r,\,u}$ contains a single-bit from the sub-bitmap and the corresponding amplitude and phase information of the combining coefficient. Note that the bit $k_{r,\,u}$ is immediately followed by the sub-segment $k_{r,\,u+1}$, when $k_{r,\,u}$ is '0'. This is due to the absence of the amplitude and phase information associated with bit $k_{r,\,u}$.

In accordance to an embodiment, the bitmaps and the information of the combining coefficients for the RI layers of a CSI report are segmented into D segments, where each segment contains the bitmap, sub-bitmap, associated with all SD components of a single DD basis index for all RI layers. In addition, each segment may contain the associated amplitude and/or phase information of the combining coefficients for the RI layers associated with the sub-bitmap. The CSI subgroup that has the highest priority and is associated with a single CSI report may contain one or more of the D segments.

Each CSI subgroup with the highest priority may contain in addition a set of parameters required from the CSI report such that the gNB may be able to recalculate the CSI matrix based on the fraction of the bitmaps for the RI layers and the amplitude and/or phase information of the combining coefficients contained in the CSI subgroup.

In accordance to an embodiment, when the CSI payload containing the CSI information of $N_{REP}$ CSI reports is decomposed into a number of CSI subgroups, and each CSI subgroup contains CSI information that is associated only with a single CSI report, and in addition, when the UE is configured to perform a segmentation of the bitmaps and amplitude and/or phase information of the combining coefficients to the CSI subgroups with respect to DD basis vector indices, each CSI subgroup with the highest priority may contain in addition at least the following parameters:
- the selected SD basis subset indicator including the rotation oversampling factors,
- the selected DD basis subset indicator(s) for the RI layers,
- the SCI(s) for the RI layers, and
- the polarization reference amplitude value(s) for the RI layers, and
- possible additional parameter(s) associated with the DD basis subset indication.

In accordance to an embodiment, when the CSI payload containing the CSI information of $N_{REP}$ CSI reports is decomposed into a number of CSI subgroups, and the first CSI subgroup contains CSI information that is associated to $N_{REP}$ CSI reports, and in addition, when the UE is configured to perform a segmentation of the bitmaps and amplitude and/or phase information of the combining coefficients to the CSI subgroups with respect to DD basis vector indices, the joint CSI subgroup may contain at least one of the following parameters:
- the selected SD basis subset indicator including, if configured, the rotation oversampling factors,
- the selected DD basis subset indicator(s) for the RI layers, the SCI(s) for the RI layers, and
- the polarization reference amplitude value(s) for the RI layers,
- possible additional parameter(s) associated with the DD basis subset indication.

The remaining CSI subgroups contain at least the CSI content associated with the bitmaps for the RI layers and the phase and amplitude information of the combining coefficients. Each CSI subgroup with the highest priority and associated with a single CSI report may contain at least a fraction of the bitmaps for the RI layers and the phase and amplitude information of a fraction of the $K_{NZ}$ combining coefficients.

For some examples, T=2, and group 1 includes indices $i_{1,\,5}$, if reported, $i_{1,\,6,\,l}$, the v2LD-$\lfloor K_{NZ}/2 \rfloor$ highest priority elements of $i_{1,\,7,\,l}$, $i_{2,\,3,\,l}$, the $\lceil K_{NZ}/2 \rceil$-v highest priority elements of $i_{2,\,4,\,l}$ and the $\lceil K_{NZ}/2 \rceil$-v highest priority elements of $i_{2,\,5,\,l}$ (l=1, . . . , v). Here, group 1 is the CSI subgroup per CSI report that has the highest priority other than the joint CSI subgroup. The index $i_{1,\,5}$ denotes the window parameter ($M_{init}$) associated with the DD basis subset indication. The indices $i_{1,\,6,\,l}$ are associated with the selected DD basis subset indicators for RI layers (l=0, . . . v), and $i_{2,\,3,\,l}$ (l=0, . . . v) are associated with the polarization reference amplitude values for the RI layers. The indicator $i_{1,\,7,\,l}$ is associated with the bitmap of v layers and the v2LD-$\lfloor K_{NZ}/2 \rfloor$ highest priority elements of $i_{1,\,7,\,l}$ in group 1 indicates a fraction of the bitmap of v layers in group 1. The indicator $i_{2,\,4,\,l}$ is associated with the amplitude information of the $K_{NZ}$ non-zero coefficients and the indicator $i_{2,\,4,\,l}$ in group 1 indicates the amplitude value information of a fraction of the $K_{NZ}$ highest priority non-zero coefficients. The indicator $i_{2,\,5,\,l}$ is associated with the phase information of the $K_{NZ}$ non-zero coefficients and the indicator $i_{2,\,5,\,l}$ in group 1 indicates the phase information of a fraction of the $K_{NZ}$ highest priority non-zero coefficients.

For some examples, T=2 and group 2 includes the $\lfloor K_{NZ}/2 \rfloor$ lowest priority elements of $i_{1,\,7,\,l}$, the $\lfloor K_{NZ}/2 \rfloor$ lowest priority elements of $i_{2,\,4,\,l}$ and the $\lfloor K_{NZ}/2 \rfloor$ lowest priority elements of $i_{2,\,5,\,l}$ (l=1, . . . v). Here, group 2 is the CSI subgroup per CSI report that has the lowest priority. The indicator $i_{1,\,7,\,l}$ is associated with the bitmap of v layers and the indicator $i_{1,\,7,\,l}$ in group 2 indicates the remaining fraction of the bitmap of v layers i.e., the $\lfloor K_{NZ}/2 \rfloor$ lowest priority elements of $i_{1,\,7,\,l}$ that is not contained in group1. The indicator $i_{2,\,4,\,l}$ is associated with the amplitude information of the $K_{NZ}$ non-zero coefficients and the indicator $i_{2,\,4,\,l}$ in group 2 indicates the amplitude information of $\lceil K_{NZ}/2 \rceil$ lowest priority non-zero coefficients. The indicator $i_{2,\,5,\,l}$ is associated with the phase information of the $K_{NZ}$ non-zero coefficients and the indicator $i_{2,\,5,\,l}$ in group 2 indicates the phase information of $\lfloor K_{NZ}/2 \rfloor$ lowest priority non-zero coefficients.

Depending on the structure of the joint CSI subgroup with the highest priority, priority level 0, each CSI subgroup with the highest priority associated with a single CSI report may also contain the following parameters, when not already listed in the joint CSI subgroup:
- the selected DD basis subset indicator(s) for the RI layers,
- the SCI(s) for the RI layers, and
- the polarization reference amplitude value(s) for the RI layers,
- possible additional parameter(s) associated with the DD basis subset indication.

When the UE is enforced to perform a cyclic shift operation on the selected combining coefficients and the selected DD basis vectors per layer with respect to the DD basis vector index that is associated with the SCI, after the cyclic shift operation only the part of the bitmap which is associated with all SD basis vectors and the first DD basis vector, DD basis vector index 0, is required for each of the RI layers to identify the SD and DD basis indices associated with the strongest combining coefficient. In order to interpret the SCI(s) in a correct way, the first CSI subgroup should contain the fraction of the bitmap and the information of the combining coefficients associated with the DD basis vector index 0.

Note that when the SCI is given by a $\lceil \log_2 (2U) \rceil$ bit indicator, the SCI may not be indicated in the sub-bitmap associated with DD basis vector index 0, and hence the sub-bitmap per layer may have a size of 2U−1×1 instead of 2U×1.

In accordance to an embodiment, when the UE is configured for a CSI report to perform a cyclic shift operation on the selected combining coefficients and the selected DD basis vectors per layer with respect to the DD basis vector index that is associated with the SCI, the CSI subgroup with the highest priority associated with a CSI report contains the sub-bitmap which is associated with DD basis vector index 0 and the corresponding amplitude and/or phase information of the combining coefficients associated with that sub-bitmap for the RI layers. For example, the first segment of a CSI subgroup with highest priority may be associated with DD basis vector index 0.

When the UE is not enforced to perform a cyclic shift on the selected combining coefficients and the selected DD basis vectors per layer with respect to the DD basis vector index that is associated with the SCI, the complete bitmap for all selected SD and DD basis vectors per layer may be required by the gNB to identify the SD and DD basis vector indices associated with the strongest combining coefficient. Therefore, the above segmentation of bitmaps and combining coefficients with respect to DD basis vector indices may not be possible.

In accordance to an embodiment, when UE is not enforced to perform a cyclic shift operation on the selected combining coefficients and the selected DD basis vectors per layer with respect to the DD basis vector index that is associated with the SCI for a CSI report, the CSI subgroup of the CSI report with highest priority may contain at least the bitmaps for the RI layers and all or a fraction of the phase and/or amplitude information of the combining coefficients of the CSI matrix of the CSI report. In the case that the CSI subgroup contains only a fraction of the phase and/or amplitude information of the combining coefficients, the remaining CSI subgroups of the CSI report with lower priority may contain the remaining fraction of the phase and/or amplitude information of the combining coefficients of the CSI matrix.

In accordance to an embodiment, when UE is not enforced to perform a cyclic shift operation on the selected combining coefficients and the selected DD basis vectors per layer with respect to the DD basis vector index that is associated with the SCI for a CSI report, and when the CSI payload containing the CSI information of $N_{REP}$ CSI reports is decomposed into a number of CSI subgroups that comprise a joint CSI subgroup which contains CSI information that is associated to $N_{REP}$ CSI reports, the joint CSI subgroup may contain the bitmaps for the RI layers of that CSI report.

Segmentation with Respect to Layers

The second segmentation scheme partitions for a CSI report the bitmaps and the combining coefficients with respect to the RI layers of the CSI matrix indicated in the CSI report.

In accordance with embodiments, a CSI subgroup that is associated with highest priority of a CSI report may contain at least the bitmap(s) for indicating the non-zero combining coefficients for a first subset of the RI layers, and a first fraction of the amplitude and phase values of the selected non-zero delay-domain combining coefficients associated with the first subset of the RI layers of the CSI matrix indicated in the CSI report.

The remaining CSI subgroups with lower priority associated with the same CSI report may contain at least the bitmap(s) for the remaining, second subset, of the RI layers and the remaining fraction of amplitude and phase values associated with the second subset of the RI layers of that CSI report.

When the UE is configured to decompose the CSI payload with respect to above-described scheme 1, the CSI subgroup with highest priority per CSI report may contain in addition the following parameters:

the selected SD basis subset indicator including, if configured, the rotation oversampling factors,
the selected DD basis subset indicator(s) for a first subset of the RI layers,
the SCI(s) for a first subset of the RI layers,
the polarization reference amplitude value(s) for a first subset of the RI layers,
the bitmap(s) for indicating the non-zero combining coefficients for a first subset of the RI layers,
possible additional parameter(s) associated with the DD basis subset indication.

When the UE is configured to decompose the CSI payload with respect to above-described scheme 2, the CSI subgroup with highest priority per CSI report of a CSI report may also contain in addition the following parameters, when not already listed in the joint CSI subgroup:

the selected DD basis subset indicator(s) for the RI layers,
the SCI(s) for the RI layers,
the polarization reference amplitude value(s) for the RI layers,
possible additional parameter(s) associated with the DD basis subset indication.

Wideband CSI information

In 3GPP Release 15, the CSI part 2 decomposition contains in the first CSI portion with priority level 0 the so-called wideband amplitudes of the $N_{REP}$ CSI reports. Based on these wideband amplitudes in the first CSI portion, the gNB can reconstruct per CSI report a wideband CSI matrix for the configured subbands even in the case that the UE has dropped all except the first CSI portion with priority level 0. A similar wideband CSI matrix can be defined for the two codebook-based CSI reporting scheme when applying the second CSI decomposition scheme described above. The gNB may derive a wideband CSI matrix for a CSI report when it has knowledge on the amplitude information of the combining coefficients and the fraction of the bitmap associated with the "strongest" DD basis vector index for each of the RI layers. In many cases, the "strongest" DD basis vector index for per layer corresponds to the DD basis vector index that is associated with the SCI. Therefore, based on the SCI, the bitmap associated with the DD basis vector index which is associated with the SCI and amplitude information of the combining coefficients, the gNB may reconstruct a wideband CSI matrix as proposed in the following embodiments.

In accordance to an embodiment, when the CSI payload containing the CSI information of $N_{REP}$ CSI reports is decomposed into a number of CSI subgroups, and the first CSI subgroup contains CSI information that is associated to $N_{REP}$ CSI reports, the joint CSI subgroup may contain the SCI(s) for the RI layers, the fraction of the bitmap and the amplitude and/or phase information of the combining coefficients associated with all SD components of the DD basis vector index which is associated with the SCI(s) for the RI layer(s) of one or more CSI reports, Based on the information contained in the joint CSI subgroup, the gNB is able to recalculate a wideband CSI matrix for each of the one or more CSI reports.

Similar to the discussion of the cyclic shift operation above, when the UE is configured for a CSI report to perform a cyclic shift operation on the selected combining coefficients and the selected DD basis vectors per layer with respect to the DD basis vector that is associated with the SCI, then the DD basis vector index 0 is associated with the SCI.

In accordance to an embodiment, when the CSI payload containing the CSI information of $N_{REP}$ CSI reports is decomposed into a number of CSI subgroups, and the first CSI subgroup contains CSI information that is associated to $N_{REP}$ CSI reports, the joint CSI subgroup may contain for one or more CSI reports, the SCI(s) for the RI layers, the fraction of the bitmap and the amplitude and/or phase information of the combining coefficients associated with all SD components and DD basis vector index 0 for the RI layers per CSI report.

Moreover, as discussed above, when the UE is not enforced to perform a cyclic shift operation for a CSI report on the selected combining coefficients, the complete bitmap for all selected SD and DD basis vector indices per layer and at least the amplitude and/or phase information of the combining coefficients associated with the DD basis vector index which is associated with the SCI(s) for the RI layer(s) is required to calculate the wideband matrix of that CSI report.

In accordance to an embodiment, when the CSI payload containing the CSI information of $N_{REP}$ CSI reports is decomposed into a number of CSI subgroups, and the first CSI subgroup contains CSI information that is associated to $N_{REP}$ CSI reports, and when the UE is not enforced to perform a cyclic shift operation on the selected combining coefficients for a CSI report, the joint CSI subgroup may contain the complete bitmap for all selected SD and DD basis vector indices per layer and at least the amplitude and/or phase information of the combining coefficients associated with the DD basis vector index which is associated with the SCI(s) for the RI layer(s) of that CSI report.

The size of the joint CSI subgroup depends on the number of non-zero combining coefficients associated with the DD basis vector index of the SCI(s) of the one or more CSI reports. The gNB may therefore even after decoding CSI part 1 of the CSI payload not know the payload size of the joint CSI subgroup. In the following, a method that fixes the payload size of the joint CSI subgroup is proposed.

In accordance to an embodiment, the joint CSI subgroup contains at least the SCI(s) for the RI layers, the fraction of the bitmap and the amplitude and/or phase information of the combining coefficients associated with all SD components and the DD basis vector index of the SCI for the RI layers, for the N CSI reports that have the highest priority.

The value for the parameter N may be either higher-layer configured by the gNB, or it is a priori known by the UE, e.g., fixed by specification, or it is determined by the UE.

For example, the UE may determine the value of the parameter N, i.e., the number of CSI reports that have the highest priority, such that the payload size of the joint CSI subgroup is fixed.

Reading/Packing Rules when Bitmaps of RI Layers are Contained in a Single CSI Subgroup As explained before, the CSI subgroup that has the highest priority and is associated with a single CSI report may contain the bitmaps of all RI layers and only a fraction of the phase and/or amplitude information of the combining coefficients.

The following embodiment presents a decomposition scheme for the phase and/or amplitude information of the combining coefficients with respect to a number of CSI subgroups. The decomposition of the phase and/or amplitude information of the combining coefficients may depend on the ordering of the bit-sequences of the associated bitmap for the RI layers of a CSI report.

In accordance with embodiments, when the bitmaps of all RI layers of size 2UD×RI associated with a single CSI report are contained in a single CSI subgroup, the bitmap is segmented into RI segments, each of 2UD bits, in an increasing order with respect to the layer numbers. Each segment is associated with all SD and DD basis indices of a layer, see FIG. 12. In case of UCI omission, the UE drops first the CSI content associated with one or more of the higher layer(s), and then the CSI content associated with one or more of the lower layer(s). For example, for RI=4 and T=2, the UE may first drop the CSI content associated with layer 3 and 4, CSI subgroup with lower priority, and then drop the CSI content associated with layer 1 and 2, CSI subgroup with high priority, of a CSI report.

The bit-sequence in each segment may be ordered with respect to one of the following two schemes: In a first ordering scheme (scheme 1), the bits in each segment of size 2UD×1 are ordered in a way that the first 2U bits are associated with all 2U SD components of the first DD basis index, followed by 2U bits that are associated with all 2U SD components of the second DD basis index, and so on, see FIG. 13. In a second ordering scheme (scheme 2), the bits in each segment of size 2UD×1 are ordered in a way that the first D bits are associated with all D DD basis indices of the first SD basis index, followed by D bits that are associated with all D DD basis indices of the second SD basis index, and so on, see FIG. 14 or FIG. 15.

When the bitmaps are ordered as shown in FIG. 13 or FIG. 14 or FIG. 15, the fraction of phase and/or amplitude information of the combining coefficients contained in a CSI subgroup is always associated with only a subset of the RI layers of a CSI report. Such an ordering/packing may result in a significant performance loss compared to dropping only a part of the phase and/or amplitude information of the combining coefficients of all RI layers. The following embodiment presents an alternative ordering/segmentation of the bitmaps and combining coefficients that avoids a dropping of the combining coefficients of one or more layers of a CSI report.

In accordance with embodiments, when a CSI subgroup contains the bitmaps of all RI layers, the bitmap of size 2UD×RI is segmented into D segments, and each segment has a size of 2U×RI and is associated with a single DD basis vector index, see FIG. 16. In case of UCI omission, the UE drops first the CSI content associated with one or more DD basis indices of all RI layers, and then the CSI content associated with the remaining DD basis indices of all RI layers. For example, for D=4, the UE may first drop the CSI content associated DD basis index 3 and 4, and then the CSI content associated with DD basis index 1 and 2 of a CSI report.

The bit-sequence in each segment may be ordered with respect to one of the following two schemes: In a first ordering scheme (scheme 1), the bits in each segment of size 2U×RI are ordered in a way that the first RI bits are associated with the first SD basis vector index of all RI layers, followed by the next RI bits associated with the second SD basis index of all RI layers, and so on, see FIG. 17 and FIG. 18. In a second ordering scheme (scheme 2), the bits in each segment of size 2U×RI are ordered in a way that the first 2U bits are associated with all 2U SD components of a DD basis index associated with the first layer, followed by the 2U bits associated with all 2U SD components of a DD basis index associated with the second layer, and so on, see FIG. 19.

Packing/Ordering Rules for the Combining Coefficients

As explained in an embodiment, a CSI subgroup associated with a CSI report may contain the amplitude and phase information of a fraction of the combining coefficients, where different ordering schemes for the amplitude and phase values may be applied.

In accordance with an embodiment, the amplitude and phase information of the combining coefficients in a CSI subgroup may be ordered by one of the following schemes. In scheme 1, for each combining coefficient in CSI subgroup, the amplitude information, a bits, is followed by the phase information, b bits, see FIG. 20, where X denotes the number of combining coefficients contained in the CSI subgroup. In scheme 2, the amplitude information of X combining coefficients, Xa bits, is followed by the phase information of X combining coefficients, Xb bits, see FIG. 21. In scheme 3, the phase information of X combining coefficients, Xb bits, is followed by the amplitude information of X combining coefficients, Xa bits, see FIG. 22.

In one example, according to scheme 2, in the CSI subgroup with highest priority per CSI report other than the joint CSI subgroup, the $$\left(\left\lceil \frac{K_{NZ}}{2} \right\rceil - v\right) \times a$$

highest priority bits associated with the amplitude values are followed by the $(\lceil K_{NZ}/2 \rceil - v) \times b$ highest priority bits associated with the phase values.

In one example, according to scheme 2, in the CSI subgroup with lowest priority per CSI report, the $(\lfloor K_{NZ}/2 \rfloor) \times a$ lowest priority bits associated with the amplitude values are followed by the $(\lfloor K_{NZ}/2 \rfloor) \times b$ lowest priority bits associated with the phase values.

Bit-Width of the Subgroups

In accordance with embodiments, the bit-width of the first CSI subgroup associated with a single CSI report and highest priority may be fixed and given by A+B, where A is the combined bit-width of all components that are contained in the first subgroup apart from the number of non-zero combining coefficients, and B is the bit-width associated with the amplitude (a) and phase information (b) of a fraction of the combining coefficients $$\left\lceil \frac{K_{NZ}}{x} \right\rceil.$$

For example, for T=2, when the first subgroup contains only the bitmaps of all layers and a fraction of the combining coefficients $$\left\lceil \frac{K_{NZ}}{x} \right\rceil,$$

then the bit-widths of the first CSI subgroup and second CSI subgroup 2 are given by $$X_{subgroup1} = 2UD \times RI + \left\lceil \frac{K_{NZ}}{x} \right\rceil (a+b), \text{ and}$$

$$X_{subgroup2} = \left(K_{NZ} - \left\lceil \frac{K_{NZ}}{x} \right\rceil\right)(a+b),$$

respectively.

In one example, x=T.

Extension of Ordering Rules:

The CSI subgroup that has the highest priority and is associated with a single CSI report may contain the bitmap of all RI layers and only a fraction of the CSI content associated with the phase and amplitude information of the combining coefficients. In the following, different decomposition schemes for the CSI content associated with the combining coefficients of a CSI report with respect to the CSI subgroups are proposed.

It is assumed that the ordering of the phase and amplitude information of the combining coefficients is consistent with the ordering of the bit-sequences associated with the bitmap of all RI layers.

Sorting of DD Basis Indices:

In accordance with embodiments, the UE is configured to segment the bitmap of the l-th layer into D bit-sequences with respect to the selected DD basis indices, where each segment has a size of 2U×1. The bitmap of the l-th layer can hence be written as $$B^{(l)} = B^{(l)}_{e_{l,0}}, \dots, B^{(l)}_{e_{l,d}}, \dots, B^{(l)}_{e_{l,D-1}},$$

where $B_{e_{l,d}}^{(l)}$ contains 2U×1 bits associated with 2U spatial beams of the DD basis index $e_{l,d} \in \{0, \dots, N_3-1\}$. Note that each DD basis index is associated with a delay vector from the delay codebook.

In an exemplary embodiment, the DD basis indices $e_{l,d}$ of the bitmap of the l-th layer and the associated combining coefficients are sorted in ascending order, i.e., $e_{l,0} < \dots < e_{l,d} < \dots < e_{l,D-1}$. For instance, when the selected DD basis indices are given by [0, 21, 2, 25], the DD basis indices are ordered as $[e_{l,0}, e_{l,1}, e_{l,2}, e_{l,3}]=[0, 2, 21, 25]$ and the corresponding bitmap is given by $B_0, B_2, B_{21}, B_{25}$.

FIG. 23 illustrates a first scheme showing the ordering of DD basis indices starting from DD basis index 0, followed by DD index 1, on the right, then DD index 25, on the left, and so on for a delay codebook size of $N_3=26$.

Figure 24:
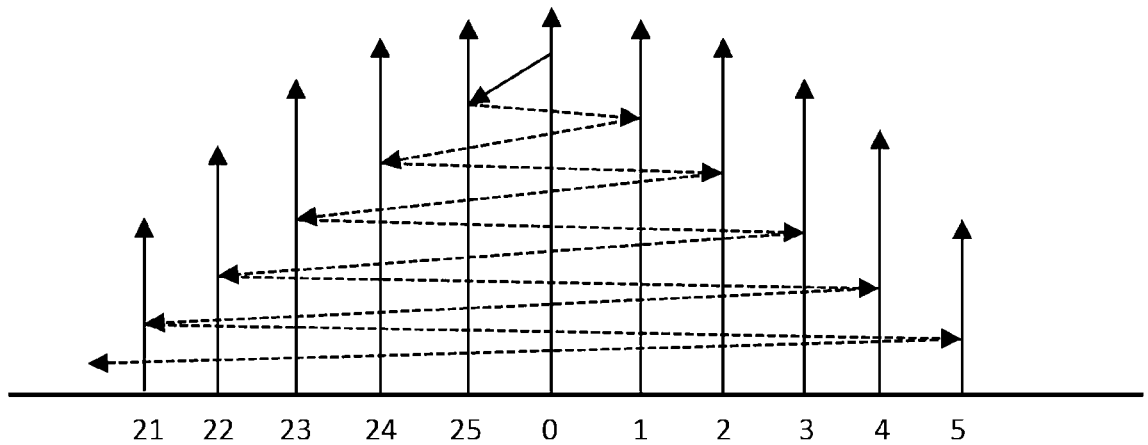
FIG. 24 is a schematic illustration of a second scheme for ordering of DD basis indices.

FIG. 24 illustrates a second scheme showing the ordering of DD basis indices starting from DD basis index 0, followed by the DD basis index 25, on the left, and DD basis index 1, on the right, and so on for $N_3=26$.

The DD basis index 0 is associated with strongest combining coefficient, and therefore, it carries a significant amount of the power of the combining coefficients of the precoder. The power of the selected DD basis indices by the UE is therefore decaying with respect to DD basis index 0. This means a significant amount of the power is associated with DD basis index 0, followed by the adjacent DD basis indices that carry less power. In case of UCI omission, the UE shall drop at first the combining coefficients that carry less power which implies that the selected DD basis indices should be ordered with respect to their power in a decreasing order. FIG. 23 and FIG. 24 show two ordering schemes for the $N_3$ DD basis indices (0, ..., $N_3$−1), where $N_3$ denotes the number of DD basis indices of the delay codebook.

In the first scheme, shown in FIG. 23, the $N_3$ DD basis indices are ordered as $$0, 1, N_3 - 1, 2, N_3 - 2, 3, N_3 - 3, 4, N_3 - 4, 5, \ldots$$

In the second scheme, shown in FIG. 24, the $N_3$ DD basis indices are ordered as $$0, N_3 - 1, 1, N_3 - 2, 2, N_3 - 3, 3, N_3 - 4, 4, N_3 - 5, 5, \ldots$$

In accordance to embodiments, the UE is configured to order the selected DD basis indices per layer according to the first or second scheme as shown in FIG. 23 and FIG. 24, respectively. For example, when $N_3$=26 and the selected DD basis indices for the l-th layer are given by [0, 2, 21, 24] or by [0, 1, 2, 22, 23, 24] and the first scheme is applied, the DD basis indices are ordered such that $[e_{l,0}, e_{l,1}, e_{l,2}, e_{l,3}]$=[0, 2, 24, 21] or $[e_{l,0}, e_{l,1}, e_{l,2}, e_{l,3}, e_{l,4}, e_{l,5}]$=[0, 1, 2, 24, 23, 22], respectively. Similarly, when the selected DD basis indices are given by [0, 2, 21, 24] or by [0, 1, 2, 22, 23, 24] and the second scheme is applied, the DD basis indices are ordered such that $[e_{l,0}, e_{l,1}, e_{l,2}, e_{l,3}]$=[0, 24, 2, 21] or $[e_{l,0}, e_{l,1}, e_{l,2}, e_{l,3}, e_{l,4}, e_{l,5}]$=[0, 1, 24, 2, 23, 22], respectively.

For some examples, the ordering of the selected DD basis indices for all layers according to the second ordering scheme is realized by the following equation which is a function of the layer index l, selected D DD basis indices and the size of the delay codebook $N_3$:

$$\pi(f) = \min\left(2 \cdot n_{3,l}^{(f)}, 2 \cdot \left(N_3 - n_{3,l}^{(f)}\right) - 1\right)$$

with l=1, 2, ..., v, and f=0, 1, ..., D−1, where $n_{3,l}^{(f)}$ is the f-th DD basis index out of D DD basis indices for each layer.

The bitmap of the l-th layer can hence be written as $$B^{(l)} = B_{e_{l,0}}^{(l)}, \ldots, B_{e_{l,d}}^{(l)}, \ldots, B_{e_{l,D-1}}^{(l)},$$

where $B_{e_{l,d}}^{(l)}$ contains 2U×1 bits associated with 2U SD components of the selected DD basis index $e_{l,d} \in \{0, \ldots, N_3-1\}$.

In accordance with embodiments, when a CSI subgroup contains the bitmap of size 2UD×RI, i.e., the bitmap of all RI layers, the bit-sequences of the bitmap of a layer can be ordered with respect to the first or second scheme. The corresponding ordered bitmaps for the RI layers can be grouped together to a bitmap of size 2UD×RI and segmented into D segments, where each segment has a size of 2U×RI, see FIG. 16. The bitmap can hence be written as $$B_{e_{1,0}}^{(1)}, \ldots, B_{e_{l,0}}^{(l)}, \ldots, B_{e_{RI,0}}^{(RI)} \ldots B_{e_{1,d}}^{(1)}, \ldots, B_{e_{l,d}}^{(l)},$$
$$\ldots, B_{e_{RI,d}}^{(RI)} \ldots B_{e_{1,D-1}}^{(1)}, \ldots, B_{e_{l,D-1}}^{(l)}, \ldots, B_{e_{RI,D-1}}^{(RI)}$$

where the d-th segment $A_d$ $\{B_{e_{1,d}}^{(1)}, \ldots, B_{e_{l,d}}^{(l)}, \ldots, B_{e_{RI,d}}^{(RI)}\}$ contains 2U×RI bits associated with 2U SD components of all RI layers.

Ordering of SD and Layer Indices within a Segment $A_d$:

The following embodiments describe different ordering schemes for the bit-sequences of a segment $A_d$ from the bitmap. Each segment $A_d$ contains 2U×RI bits which are associated with the 2U beams and RI layers. Let $b_{g_{l,u}}$ be the bit associated with the $g_{l,u}$-th beam index and l-th layer. Here, $g_{l,u}(g_{l,u} \in \{0, \ldots, U-1\}, u \in \{0, \ldots, U-1\})$ denotes the $g_{l,u}$-th beam index of a spatial beam for one polarization of the l-th layer. In the following, the parameter $g_{l,U+u}$ ($g_{l,U+u} \in \{U, \ldots, 2U-1\}, u \in \{0, \ldots, U-1\}$) is used to denote the $g_{l,u}$-th beam index of the same spatial beam for the other polarization of the l-th layer.

The spatial beam indices u and U+u are associated with the beam u (SD basis index), which in turn is associated with an SD index selected from the codebook. For example, for U=2, and the selected SD indices [1, 3], the spatial beam indices 0 and 2 are associated with the SD index 1, and the spatial beam indices 1 and 3 are associated with the SD index 3.

Figure 25:
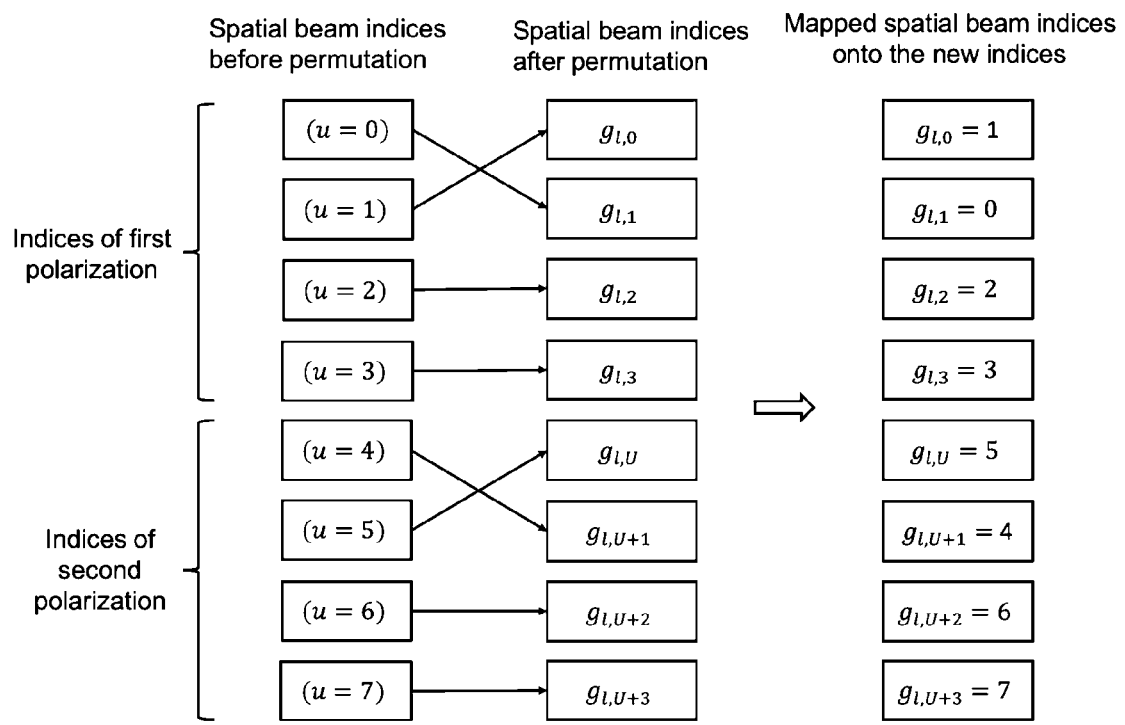
FIG. 25 is an illustration of mapping of the spatial beam indices to the indices $g_{l,\ u}$ and $g_{l,\ U+t}$

An example of a mapping of the spatial beam indices (u=0, ... 2U−1) to the indices $g_{l,u}$ of one polarization and indices $g_{l,U+u}$ of the other polarization of l-th layer is shown in FIG. 25 for U=4.

A Third Ordering Scheme

In a third scheme, the bits in segment $A_d$ associated with the beam indices of the two polarizations of a spatial beam are grouped together and sorted with respect to an increasing layer index. This means, two bits associated with the two polarizations of the u-th spatial beam, spatial beam indices $g_{l,u}$ and $g_{l,U+u}$, of the first layer are grouped together and followed by two bits associated with the two polarizations of the same spatial beam, spatial beam indices $g_{l,u}$ and $g_{l,U+u}$, of the second layer, and so on. For example, for RI=4, the segment $A_d$ is given by $$b_{1,g_0}, b_{1,g_U}, b_{2,g_0}, b_{2,g_U}, b_{3,g_0}, b_{3,g_U}, b_{4,g_0}, b_{4,g_U},$$
$$b_{1,g_1}, b_{1,g_{U+1}}, b_{2,g_1}, b_{2,g_{U+1}}, b_{3,g_1}, b_{3,g_{U+1}}, \ldots$$
$$\ldots b_{4,g_1}, b_{4,g_{U+1}}, \ldots, b_{1,g_{U-1}}, b_{1,g_{2U-1}}, b_{2,g_{U-1}},$$
$$b_{2,g_{2U-1}}, b_{3,g_{U-1}}, b_{3,g_{2U-1}}, b_{4,g_{U-1}}, b_{4,g_{2U-1}}$$

The ordering of the bit-sequences with respect to the third ordering scheme of segment $A_d$ is shown in FIG. 17.

A Fourth Ordering Scheme

In a fourth ordering scheme, the bits in segment $A_d$ associated with a polarization of a spatial beam of all layers are grouped together and sorted with respect to an increasing layer index. This means, RI bits associated with the first polarization of a spatial beam index ($g_{l,u}$) are grouped together and followed by RI bits associated with the second polarization of the same spatial beam index ($g_{l,U+u}$). For example, for RI=4, the segment $A_d$ is given by $$b_{1,g_0}, b_{2,g_0}, b_{3,g_0}, b_{4,g_0}, b_{1,g_U}, b_{2,g_U}, b_{3,g_U},$$
$$b_{4,g_U}, b_{1,g_1}, b_{2,g_1}, b_{3,g_1}, b_{4,g_1}, b_{1,g_{U+1}}, b_{2,g_{U+1}} \ldots$$
$$\ldots b_{3,g_{U+1}}, b_{4,g_{U+1}}, \ldots, b_{1,g_{U-1}}, b_{2,g_{U-1}}, b_{3,g_{U-1}},$$
$$b_{4,g_{U-1}}, b_{1,g_{2U-1}}, b_{2,g_{2U-1}}, b_{3,g_{2U-1}}, b_{4,g_{2U-1}}$$

The ordering of the bit-sequences with respect to the fourth ordering scheme of segment $A_d$ is shown in FIG. 17.

A Fifth Ordering Scheme

In a fifth ordering scheme, the bits in segment $A_d$ associated with the same spatial beam index of all layers are grouped together and sorted with respect to an increasing layer index. This means, RI bits associated with a spatial beam index ($g_{l,u}$) are grouped together and followed by RI bits associated with another spatial beam index ($g_{l,u+1}$). For example, for RI=4, the segment $A_d$ is given by $$b_{1,g_0}, b_{2,g_0}, b_{3,g_0}, b_{4,g_0}, \ldots, b_{1,g_U}, b_{2,g_U}, b_{3,g_U},$$
$$b_{4,g_U}, b_{1,g_{U+1}}, b_{2,g_{U+1}}, b_{3,g_{U+1}}, b_{4,g_{U+1}}, \ldots$$
$$\ldots, b_{1,g_{2U-1}}, b_{2,g_{2U-1}}, b_{3,g_{2U-1}}, b_{4,g_{2U-1}}$$

The ordering of the bit-sequences with respect to the fifth ordering scheme of segment $A_d$ is shown in FIG. 18.

A Sixth Ordering Scheme

In a sixth ordering scheme, the bits in segment $A_d$ associated with the same layer are grouped together and sorted with respect to an increasing spatial beam index. This means, 2U bits associated with a first layer are grouped together and followed by 2U bits associated with a second layer, and so on. For example, for RI=4, the segment $A_d$ is given by $$b_{1,g_0}, \ldots, b_{1,g_{U-1}}, b_{1,g_{U+1}}, \ldots, b_{1,g_{2U-1}}, b_{2,g_0}, \ldots,$$
$$b_{2,g_{U-1}}, b_{2,g_{U+1}}, \ldots, b_{2,g_{2U-1}}, b_{3,g_0}, \ldots, b_{3,g_{U-1}}, b_{3,g_{U+1}},$$
$$\ldots, b_{3,g_{2U-1}}, b_{4,g_0}, \ldots, b_{4,g_{U-1}}, b_{4,g_{U+1}}, \ldots, b_{4,g_{2U-1}}$$

The ordering of the bit-sequences with respect to the sixth ordering scheme of segment $A_d$ is shown in FIG. 19.

In accordance to embodiments, the UE is configured to order the bit-sequences of the bitmap and the combining coefficients to one of the first and second ordering schemes combined with one of the third, fourth, fifth and sixth ordering schemes.

For some examples, the combined or joint ordering of the bit-sequences of the bitmap according to the second ordering scheme and the fifth ordering scheme is realized by the following equation:

$$Pri(l, i, f) = 2 \cdot U \cdot v \cdot \pi(f) + v \cdot i + l,$$

with $\pi(f) = \min(2 \cdot n_{3,l}^{(f)}, 2 \cdot (N_3 - n_{3,l}^{(f)}) - 1)$, with $l=1, 2, \ldots, v$, $i=0, 1, \ldots, 2U-1$, and $f=0, 1, \ldots, D-1$, where $v$ is the total number of layers, $U$ is the total number of spatial beams per polarization and $D$ is the total number of DD basis indices.

The ordering of the amplitude and phase information of the combining coefficients shall be consistent with the ordering of the bits in the bitmaps.

Permutation of Beam Indices:

Each spatial beam is associated with up to D non-zero combining coefficients. The sum power of the combining coefficients of the spatial beam associated with the strongest coefficient may be higher compared to the sum power of the combining coefficients associated with other spatial beams. Therefore, for UCI omission, the bitmap associated with the strongest spatial beam, i.e., the beam associated with the SCI, should have a higher priority than the bitmap associated with the other spatial beams, and hence, it should be ordered first, followed by the bitmaps of the other spatial beams. In the following, different permutation schemes for the spatial beam indices, indices $g_{l,u}$ and $g_{l,U+u}$, are presented.

Figure 26:
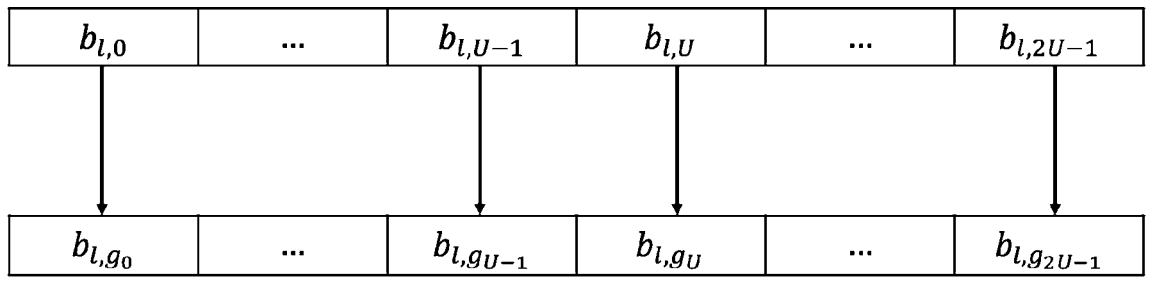
FIG. 26 is an illustration of a direct mapping of the bitmap associated with a spatial beam index u, $\forall u=0, \ldots 2U-1$ and a segment $A_d$ onto the index $g_{l,\ u}$, $\forall u=0, \ldots, 2U-1$.

In an exemplary embodiment, as shown in FIG. 26, it is illustrated a direct mapping of the bitmap associated with a spatial beam index u, $\forall u=0, \ldots 2U-1$ and a segment $A_d$ onto the index $g_{l,u}$, $\forall u=0, \ldots, 2U-1$.

In another exemplary embodiment, the bits from the bitmap associated with the spatial beam, which is associated with the strongest coefficient, for the l-th layer are mapped to index $g_{l,0}$. For the mapping of the remaining $2U-1$ indices, either a polarization common mapping or polarization specific mapping may be considered. For the polarization-common mapping, the mapping with respect to the two polarizations of a spatial beam is identical, whereas for the polarization-specific mapping, the mapping is done irrespective of the polarization of a spatial beam resulting in different mappings for the two polarizations. In the following, examples of polarization-common and polarization-specific mapping schemes are explained more in detail.

Polarization-Common Mapping:

Examples for polarization-common mappings for the bits associated with the 2U beams, the two polarizations and a segment are shown in FIGS. 27-30. The bit associated with the spatial beam, which is associated with the strongest coefficient, is marked with a red dashed line. The bit associated with the same spatial beam of the other polarization marked with a red solid line.

Figure 27:
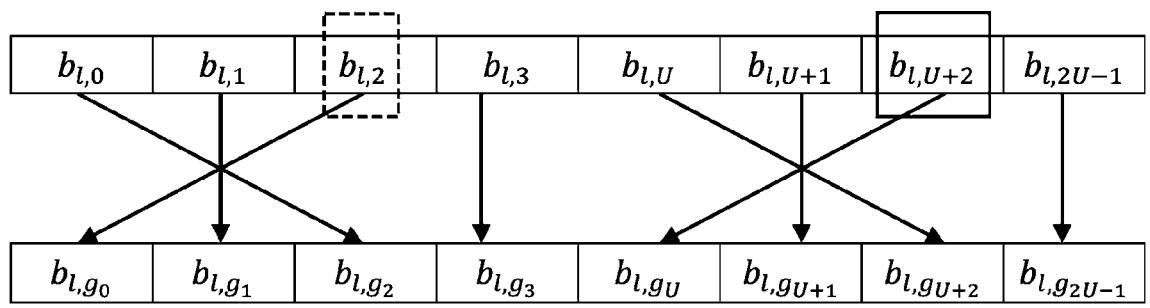
FIG. 27 is an illustration of the mapping of the bit associated with a spatial beam index u, $\forall u=0, \ldots 2U-1$ onto the index $g_{l,\ u}$, $\forall u=0, \ldots, 2U-1$, when the strongest coefficient is associated with the first polarization for U=4.

FIG. 27 illustrates the mapping of the bit associated with a spatial beam index u, $\forall u=0, \ldots 2U-1$ onto the index $g_{l,u}$, $\forall u=0, \ldots, 2U-1$, when the strongest coefficient is associated with the first polarization for U=4.

In the mapping scheme shown in FIG. 27, the spatial beam index $u_{SCI}$, $u_{SCI}=2$ in the example, associated with the strongest coefficient is mapped to the first index $g_{l,0}$. The spatial beam index ($u_{SCI}-1$) is mapped to the next index $g_{l,1}$, and so on according to the following equation:

$$g_{l,u} = \mathrm{mod}\ (u_{SCI} - u, U), u = 0, \ldots, U-1. \quad (1)$$

From equation (1), the spatial beam indices u, u=0, ..., U−1 for the polarization associated with the strongest coefficient are mapped to the indices $g_{l,u}$. The remaining spatial beam indices U+u, u=0, ... U−1 are mapped to the indices $g_{l,U+u}$ according to the following equation:

$$g_{l,U+u} = U + \mathrm{mod}\ (u_{SCI} - u, U), u = 0, \ldots, U-1. \quad (2)$$

The mapping of the spatial beam indices with respect to the two polarizations is identical, where the spatial beam indices of the polarization associated with the strongest coefficient are mapped to the indices $g_{l,0} \ldots g_{l,U-1}$, and the spatial indices of the other polarization are mapped to the indices $g_{l,U} \ldots g_{l,2U-1}$.

Figure 28:
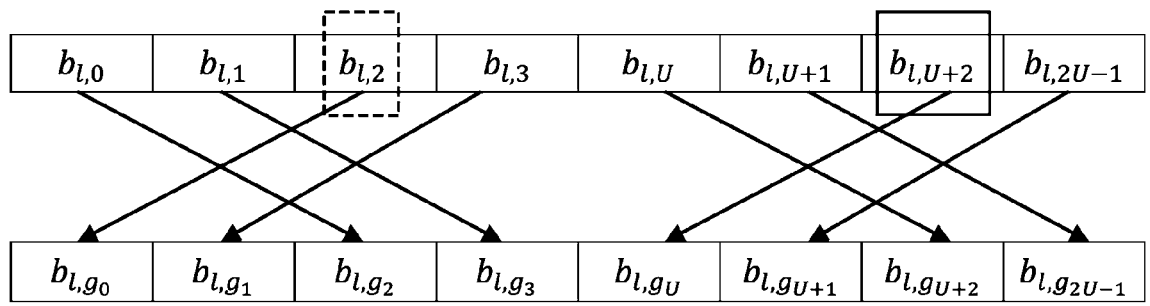
FIG. 28 is an illustration of the mapping of the bit associated with a spatial beam index u, $\forall u=0, \ldots 2U-1$ onto the index $g_{l,\ u}$, $\forall u=0, \ldots, 2U-1$, when the strongest coefficient is associated with the first polarization for U=4.

FIG. 28 illustrate the mapping of the bit associated with a spatial beam index u, $\forall u=0, \ldots 2U-1$ onto the index $g_{l,u}$, $\forall u=0, \ldots, 2U-1$, when the strongest coefficient is associated with the first polarization for U=4.

In the mapping scheme shown in FIG. 28, the spatial beam index $u_{SCI}$ ($u_{SCI}=2$ in the example) associated with the strongest coefficient is mapped to the first index $g_{l,0}$. The spatial beam index ($u_{SCI}$+1) is mapped to the next index $g_{l,1}$, and so on according to the following equation:

$$g_{l,u} = \mod(u - u_{SCI}, U), u = 0, \ldots, U - 1. \quad (3)$$

From equation (3), the spatial beam indices u, u=0, . . . , U−1 for the polarization associated with the strongest coefficient are mapped to the indices $g_{l,u}$. The remaining spatial beam indices U+u, u=0, . . . U−1 are mapped to the indices $g_{l,U+u}$ according to the equation:

$$g_{l,U+u} = U + \mod(u - u_{SCI}, U), u = 0, \ldots, U - 1. \quad (4)$$

The mapping of the spatial beam indices with respect to the two polarizations is identical, where the spatial beam indices of the polarization associated with the strongest coefficient are mapped to the indices $g_{l,0} \cdots g_{l,U-1}$, and the spatial indices of the other polarization are mapped to the indices $g_{l,U} \cdots g_{l,2U-1}$.

Figure 29:
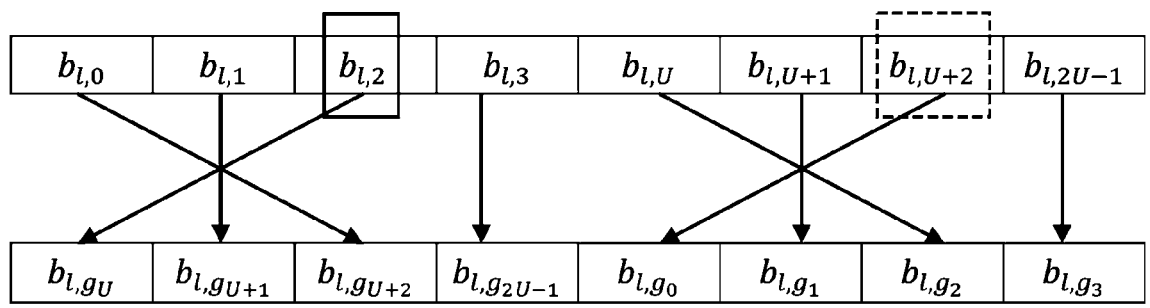
FIG. 29 is an illustration of the mapping of the bit associated with a spatial beam index u, $\forall u=0, \ldots 2U-1$ onto the index $g_{l,\ u}$, $\forall u=0, \ldots, 2U-1$, when the strongest coefficient is associated with the second polarization for U=4.

FIG. 29 illustrates the mapping of the bit associated with a spatial beam index u, ∀u=0, . . . 2U−1 onto the index $g_{l,u}$, ∀u=0, . . . , 2U−1, when the strongest coefficient is associated with the second polarization for U=4.

In the mapping scheme shown in FIG. 29, the spatial beam index (U+$u_{SCI}$) is associated with the strongest coefficient and mapped to the first index $g_{l,0}$, and the spatial beam index (U+$u_{SCI}$−1) is mapped to the next index $g_{l,1}$, and so on according to the following equation:

$$g_{l,u} = \mod(u_{SCI} - u, U), u = 0, \ldots, U - 1. \quad (5)$$

From equation (5), the spatial beam indices U+u, u=0, . . . U−1 for the polarization associated with the strongest coefficient are mapped to the indices $g_{l,u}$. The remaining spatial beam indices u, u=0, . . . U−1 are mapped to the indices $g_{l,U+u}$ according to the following equation:

$$g_{l,U+u} = U + \mod(u_{SCI} - u, U), , u = 0, \ldots, U - 1. \quad (6)$$

The mapping of the spatial beam indices with respect to the two polarizations is identical, where the spatial beam indices of a polarization associated with the strongest coefficient are mapped to the indices $g_{l,U} \cdots g_{l,2U-1}$, and the spatial indices of the other polarization are mapped to the indices $g_{l,0} \cdots g_{l,U-1}$.

Figure 30:
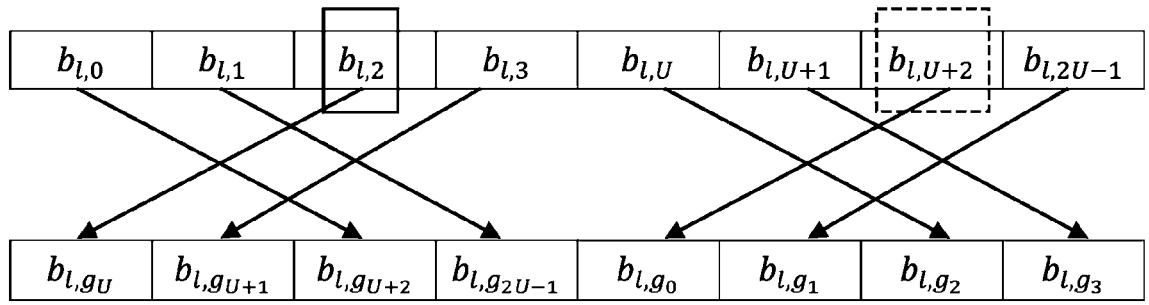
FIG. 30 is an illustration of the mapping of the bit associated with a spatial beam index u, $\forall u=0, \ldots 2U-1$ onto the index $g_{l,\ u}$, $\forall u=0, \ldots, 2U-1$, when the strongest coefficient is associated with the first polarization for U=4.

FIG. 30 illustrates the mapping of the bit associated with a spatial beam index u, ∀u=0, . . . 2U−1 onto the index $g_{l,u}$, ∀u=0, . . . , 2U−1, when the strongest coefficient is associated with the first polarization for U=4.

In the mapping scheme shown in FIG. 30, the spatial beam index (U+$u_{SCI}$) is associated with the strongest coefficient and mapped to the first index $g_{l,0}$ and the spatial beam index (U+$u_{SCI}$+1) is mapped to the next index $g_{l,1}$, and so on according to the following equation:

$$g_{l,u} = \mod(u - u_{SCI}, U), u = 0, \ldots, U - 1. \quad (7)$$

From equation (7), the spatial beam indices U+u, u=0, . . . U−1 for the polarization associated with the strongest coefficient are mapped to the indices $g_{l,u}$. The remaining spatial beam indices u, u=0, . . . U−1 are mapped to the indices $g_{l,U+u}$ according to the following equation:

$$g_{l,U+u} = U + \mod(u - u_{SCI}, U), u = 0, \ldots, U - 1. \quad (8)$$

The mapping of the spatial beam indices with respect to the two polarizations is identical, where the spatial beam indices of a polarization associated with the strongest coefficient are mapped to the indices $g_{l,U} \cdots g_{l,2U-1}$, and the spatial indices of the other polarization are mapped to the indices $g_{l,0} \cdots g_{l,U-1}$.

Figure 31:
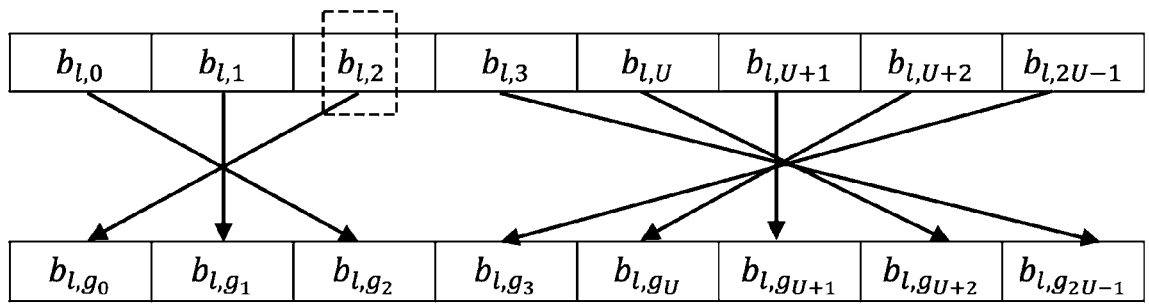
FIG. 31 is an illustration of the mapping of the bitmap associated with a spatial beam index u, $\forall u=0, \ldots 2U-1$ onto the index $g_{l,\ u}$, $\forall u=0, \ldots, 2U-1$.
Figure 32:
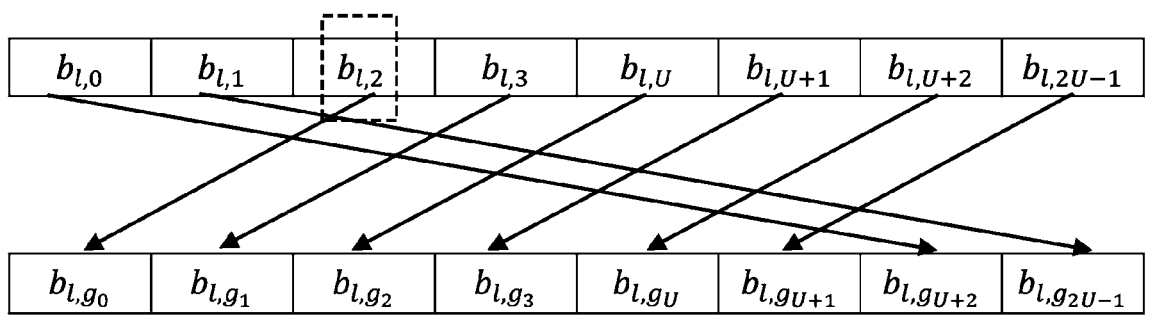
FIG. 32 is an illustration of the mapping of the bitmap associated with a spatial beam index u, $\forall u=0, \ldots 2U-1$ onto the index $g_{l,\ u}$, $\forall u=0, \ldots, 2U-1$.

Polarization-Specific Mapping:

Irrespective of the association of the strongest coefficient to the polarization, two mapping possibilities to map the spatial beam indices u, ∀u=0, . . . , 2U−1 indices onto the indices $g_{l,0}, \ldots, g_{l,2U-1}$ are presented in the following. Examples for such mappings are shown in FIG. 31 and FIG. 32. The bit associated with the spatial beam associated with the strongest coefficient is shown in a red box with a dashed line.

FIG. 31 illustrates the Mapping of the bitmap associated with a spatial beam index u, ∀u=0, . . . 2U−1 onto the index $g_{l,u}$, ∀u=0, . . . , 2U−1.

In the mapping scheme shown in FIG. 31, the spatial beam index $u_{SCI}$ ($u_{SCI}$=2 in the example) associated with the strongest coefficient is mapped to the first index $g_{l,0}$, and the spatial beam index ($u_{SCI}$−1) is mapped to the next index $g_{l,1}$ and so on according to the following equation:

$$g_{l,u} = \mod(u_{SCI} - u, 2U), u = 0, \ldots, 2U - 1. \quad (9)$$

From equation (9), the spatial beam indices u, u=0, . . . , 2U−1 are mapped to the index $g_{l,u}$ as shown in FIG. 9. The mapping of the spatial beam indices with respect to the two polarizations is not identical. Hence, this mapping can be considered as a polarization-specific mapping.

FIG. 32 illustrates the mapping of the bitmap associated with a spatial beam index u, ∀u=0, . . . 2U−1 onto the index $g_{l,u}$, ∀u=0, . . . , 2U−1.

In the mapping scheme shown in FIG. 32, the spatial beam index $u_{SCI}$ ($u_{SCI}$=2 in the example) associated with the strongest coefficient is mapped to the first index $g_{l,0}$, and the spatial beam index ($u_{SCI}$+1) is mapped to the next index $g_{l,1}$, and so on according to the following equation:

$$g_{l,u} = \mod(u - U_{SCI}, 2U), u = 0, \ldots, 2U - 1, \quad (10)$$

From equation (10), the spatial beam indices u, u=0, . . . , 2U−1 are mapped to the index $g_{l,u}$ as shown in FIG. 32. The mapping of the spatial beam indices with respect to the two polarizations is not identical.

In accordance to embodiments, the CSI subgroup of a CSI report of highest priority or the joint CSI subgroup (priority level 0) contains the bitmap for all RI layers of the CSI report. The CSI subgroup of the CSI report with highest priority further contains $$\left\lceil \frac{K_{NZ}}{2} \right\rceil$$

non-zero combining coefficients, and the other CSI subgroup with lower priority (T=2) contains the remaining $$\left\lfloor \frac{K_{NZ}}{2} \right\rfloor$$

non-zero combining coefficients. This means, in case of UCI omission, the CSI content, i.e., the amplitude and phase information of the non-zero combining coefficients, associated with the $$\left\lfloor \frac{K_{NZ}}{2} \right\rfloor$$

non-zero combining coefficients of the CSI subgroup of the CSI report with the lowest priority is dropped first.

Extension of Segmentation of Bitmaps and Coefficients:

The segmentation scheme described above partitions the bitmaps and the combining coefficients with respect to the number of configured delays (D) per layer of a CSI report, see FIG. 9. Each segment contains the bitmaps and the combining coefficients associated with 2U spatial beam indices and RI layers.

In accordance to embodiments, each segment may be further segmented into R' sub-segments, where each sub-segment contains a sub-bitmap of R bits and the combining coefficients associated with the R bits. The bits in each sub-bitmap and the combining coefficients of each segment are ordered according to the third, fourth, fifth or sixth ordering scheme.

In one example, the third ordering scheme is applied and each segment is further segmented into R'=U sub-segments, where each sub-segment may be associated with all RI layers and the two polarizations of a spatial beam and contains a sub-bitmap segment of R=2RI bits and the associated non-zero combining coefficients.

In another example, the fourth ordering scheme is applied and each segment is further segmented into R'=2U sub-segments, where each sub-segment may be associated with all RI layers and one polarization of a spatial beam and contains the bitmap segment of R=RI bits and the associated non-zero combining coefficients.

In another example, the fifth ordering scheme is considered and each segment is further segmented into R'=2U sub-segments, where each sub-segment may be associated with all RI layers and contains a sub-bitmap segment of R=RI bits and the associated non-zero combining coefficients.

For some examples, the combination of the ordering of the bit-sequences of the bitmap according to the second ordering scheme and the fifth ordering scheme is realized by the following equation:

$$Pri(l, i, f) = 2 \cdot U \cdot v \cdot \pi(f) + v \cdot i + l,$$

with $\pi(f) = \min(2 \cdot n_{3,l}^{(f)}, 2 \cdot (N_3 - n_{3,l}^{(f)}) - 1)$, with $l = 1, 2, \ldots, v$, $i = 0, 1, \ldots, 2U-1$, and $f = 0, 1, \ldots, D-1$, where v is the total number of layers, U is the total number of spatial beams per polarization and D is the total number of DD basis indices.

In another example, the sixth ordering scheme is considered and each segment is further segmented into R'=RI segments, where each sub-segment may be associated with a layer and contains a sub-bitmap segment of R=2U bits and the associated non-zero combining coefficients.

For a fixed CSI subgroup size associated with a CSI report, the above parameter R defines the packing density of the combining coefficients. The smaller the value of R, the higher the number of combining coefficients that can be packed in the CSI subgroup with the highest priority. In one instance, R=2U or R=U. In another instance R=RI or R=2RI. In another instance, R=1, and each sub-segment contains either a single bit and the associated non-zero combining coefficient, if the single bit is given by the value of '1', otherwise, it contains only a single bit and no non-zero combining coefficient.

In accordance to embodiments, when bitmaps of all RI layers are placed in the CSI subgroup with the highest priority, the ordering of the bitmaps can be different to the ordering of the combining coefficients. However, the ordering of the bitmaps and combining coefficients shall be a priori known to the gNB.

Bit-Width of CSI Subgroups

In accordance with embodiments, the bit-width of the first CSI subgroup associated with a single CSI report and highest priority may be fixed and given by A+B, where A is the combined bit-width of all components that are contained in the first subgroup apart from the number of non-zero combining coefficients, and B is the bit-width associated with the amplitude (a) and phase information (b) of a fraction of the combining coefficients $$\left\lceil \frac{K_{NZ}}{x} \right\rceil.$$

For example, for T=2, when the first CSI subgroup contains the DD basis indicators of the RI layers, the polarization-reference amplitude(s) of the RI layers, the bitmaps of the RI layers and a fraction of the combining coefficients $$\left\lceil \frac{K_{NZ}}{x} \right\rceil$$

of the RI layers, then the bit-widths of the first CSI subgroup and second CSI subgroup are given by $$X_{subgroup1} = \left\lceil \log_2 \binom{N_3 - 1}{D - 1} \right\rceil \cdot RI + a' \cdot RI + 2UD \cdot RI + \left\lceil \frac{K_{NZ}}{x} \right\rceil (a + b), \text{ if } N_3 \leq Y, \text{ or}$$

$$X_{subgroup1} = \left\lceil \log_2 \binom{N_3' - 1}{D - 1} \right\rceil \cdot RI + \lceil \log_2 N_3' \rceil + a' \cdot RI +$$

$$2UD \cdot RI + \left\lceil \frac{K_{NZ}}{x} \right\rceil (a + b), \text{ if } N_3 > Y, \text{ and}$$

$$X_{subgroup2} = \left(K_{NZ} - \left\lceil \frac{K_{NZ}}{x} \right\rceil\right)(a + b),$$

respectively, where D is the configured number of delays per layer, a' is the bit-width for the polarization-reference amplitude per layer, and $N_3'$ is a parameter indicating the window-size used for the selection of the D delays of the I-th layer used when $N_3$ is larger than a threshold (Y). Note that, in order to reduce the feedback overhead of the DD basis indication reported by the UE for large values of $N_3$, the D delays are selected per layer from a pre-defined window of $N_3'$ delays, where $N_3'<N_3$.

Strongest Coefficient Indicator

As described above, for RI=1, the strongest coefficient, out of the $K_{NZ}$ non-zero combining coefficients, may be indicated by a $\lceil \log_2 K_{NZ} \rceil$-bit indicator (SCI). Hence, in the case of bitmap segmentation as described above, the segment of the bitmap associated with the strongest coefficient may not be available to the base station in case of UCI omission when the segment associated with the strongest coefficient is placed in the CSI subgroup with the lowest priority. Consequently, the bitmap of size 2UD×RI cannot be segmented when RI=1. On the other hand, when RI>1, the strongest coefficient is indicated using a $\lceil \log_2 2U \rceil$-bit indicator (SCI) per layer instead of a $\lceil \log_2 K_{NZ} \rceil$-bit indicator, due to the cyclic shift operation performed by the UE as described above.

When the cyclic shift is performed by the UE on the combining coefficients and delays irrespective of the transmission rank, the strongest coefficient for each layer (even for RI=1) is always associated with the first DD basis index '0'. As a consequence, for RI=1, although a $\lceil \log_2 K_{NZ} \rceil$-bit indicator is used to indicate the SCI, only the first 2U codepoints are sufficient to indicate the strongest coefficient. Therefore, 2U codepoints may be used and the remaining $K_{NZ}-2U$ codepoints may be 'reserved', or not used for the indication of the strongest coefficient. Consequently, when using only 2U codepoints out of $K_{NZ}$ codepoints, the bitmap of size 2UD×RI can be segmented, as described above, even for RI=1. For example, for RI=1, for $K_{NZ}=16$, and U=4, the used and reserved codepoints are shown in Table 1.

TABLE 1

Example of codepoints for RI = 1 when the SCI is indicated using a $\lceil \log_2 K_{NZ} \rceil$-bit indicator when $K_{NZ} = 16$ and U = 4.

| $K_{NZ}$ codepoints | Bit indicator | |
|---|---|---|
| 1 | 0000 | Used |
| 2 | 0001 | Used |
| 3 | 0010 | Used |
| 4 | 0011 | Used |
| 5 | 0100 | Used |
| 6 | 0101 | Used |
| 7 | 0110 | Used |
| 8 | 0111 | Used |
| 9 | 1000 | Reserved |
| 10 | 1001 | Reserved |
| 11 | 1010 | Reserved |
| 12 | 1011 | Reserved |
| 13 | 1100 | Reserved |
| 14 | 1101 | Reserved |
| 15 | 1110 | Reserved |
| 16 | 1111 | Reserved |

In accordance to embodiments, the UE is configured to indicate the SCI for RI=1 by a $\lceil \log_2 K_{NZ} \rceil$-bit indicator (SCI). Here, 2U codepoints out of $K_{NZ}$ codepoints are used to indicate the strongest coefficient and the remaining $K_{NZ}-2U$ codepoints are reserved.

Figure 33:
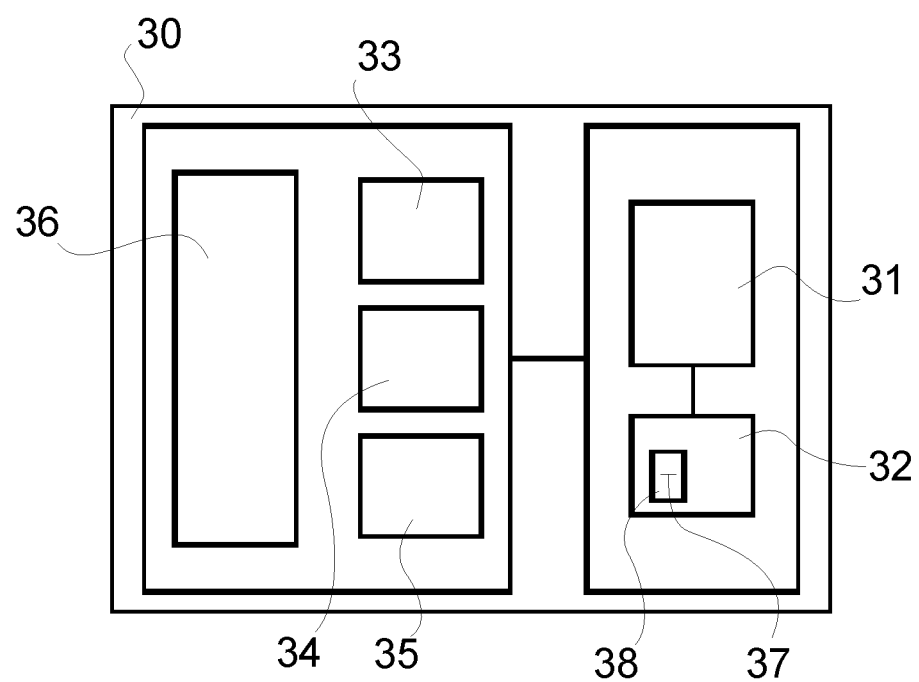
FIG. 33 is a schematic and simplified illustration of a user equipment and a computer program product.

In order to perform the methods steps and operations of the UE previously described, there is also provided a UE 30, as shown in FIG. 33, which UE 30 comprises a processor 31 or processing circuit or a processing module or a processor or means; a receiver circuit or receiver module 34; a transmitter circuit or transmitter module 35; a memory module 32; a transceiver circuit or transceiver module 33 which may include the transmitter circuit 35 and the receiver circuit 34. The UE 30 further comprises an antenna system 36 which includes antenna circuitry for transmitting and receiving signals to/from at least the UE 30.

The invention also relates to a computer program product 37, which in the figure is stored in the memory module 32, which computer program product 37 comprises computer program code 38, which, when executed by the processor 31, enables the processor 31 to perform any one of the subject matter of the inventive method.

REFERENCES

[1] 3GPP TS 38.214 V15.3.0: "3GPP; TSG RAN; NR; Physical layer procedures for data (Rel. 15).", September 2018.
[2] Samsung "Revised WID: Enhancements on MIMO for NR", RP-182067, 3GPP RAN #81, Gold Coast, Australia, Sep. 10-13, 2018.
[3] R1-1806124, Fraunhofer IIS, Fraunhofer HHI, Enhancements on Type-II CSI reporting scheme, RAN1 #93, Busan, South Korea, May 21-May 25, 2018.
[4] R1-1811088, Fraunhofer IIS, Fraunhofer HHI, Enhancements on Type-II CSI reporting scheme, RAN1 #94-Bis, Chengdu, China, Oct. 8-Oct. 12, 2018.
[5] Chairman's Notes, RAN1 #96, Athens, Greece, Feb. 25-Mar. 1, 2019.
[6] R1-1902304, Samsung, Summary of CSI enhancement for MU-MIMO, RAN1 #96, Feb. 25-Mar. 1, 2019
[7] R1-1905629, Samsung, Feature lead summary for MU-CSI—revision on selected issues, Xi'an, China, Apr. 12-16, 2019.

The invention claimed is:

1. A method performed by a user equipment (UE) for providing channel state information (CSI) feedback in the form of one or more CSI reports in a wireless communication system (A), the method comprising:
  receiving, from a network node (gNB) higher layer configuration(s) of one or more downlink reference signals, and one or more CSI report configuration(s) associated with the downlink reference signal configuration(s), and a radio signal, the radio signal including the downlink reference signal(s) according to the one or more downlink reference signal configuration(s);
  the downlink reference signal(s) being provided over a configured number of frequency domain resources, time domain resources and one or more ports,
  determining, for each CSI report, a precoding matrix based on the downlink reference signal(s) and two codebooks, the two codebooks including
    a spatial codebook comprising one or more spatial domain (SD) basis components of a precoder, and
    a delay codebook comprising one or more delay domain (DD) basis components of the precoder,
    and one or more non-zero combining coefficients for complex combining of the one or more SD and DD basis vectors; and
  reporting, to the network node, the one or more CSI reports for the one or more CSI report configurations, wherein each CSI report contains a selected precoding matrix in the form of a precoding matrix identifier, PMI, and a rank identifier, RI, indicating the transmission rank for the RI layers of the precoding matrix, and wherein each CSI report comprises two parts: CSI part 1 and CSI part 2, wherein CSI part 1 has a fixed payload size and comprises information indicating the size of the payload of CSI part 2, wherein CSI part 2 comprises at least the amplitude and phase information of the selected non-zero combining coefficients and bitmaps of all RI layers indicating the non-zero combining coefficients of the CSI report, wherein the bitmap of each layer is segmented into D bit-sequences with respect to the DD basis indices of the selected DD basis vectors, wherein each bit-sequence comprises 2U×1 bits which are associated with 2U spatial beams, wherein U denotes the number of selected SD basis vectors from the spatial codebook, and each DD basis index is associated with a delay vector from the delay codebook and, wherein the D bit-sequences are ordered with respect to one of two ordering scheme for the $N_3$ DD basis indices, where $N_3$ denotes the number of DD basis indices of the delay codebook, where the $N_3$ DD basis indices are ordered as $$0, 1, N_3 - 1, 2, N_3 - 2, 3, N_3 - 3, 4, N_3 - 4, 5,$$

according to a first ordering scheme, or where the $N_3$ DD basis indices are ordered as $$0, N_3 - 1, 1, N_3 - 2, 2, N_3 - 3, 3, N_3 - 4, 4, N_3 - 5, 5,$$

according to a second ordering scheme, and wherein the ordering of the amplitude and phase information of the combining coefficients follows the ordering of the bit-sequences of the bitmaps of all RI layers, wherein CSI part 2 of the total number of ($N_{REP}$) CSI reports is segmented into $TN_{REP}+1$ CSI subgroups, where $TN_{REP}$ is a total number of CSI subgroups associated with the $N_{REP}$ CSI reports, wherein T CSI subgroups are associated with a single CSI report, and one CSI subgroup contains information associated with all $N_{REP}$ CSI reports, and wherein each CSI subgroup is associated with a priority (priority level), wherein the joint CSI subgroup associated with priority level 0 contains CSI information of all $N_{REP}$ CSI reports, and wherein the joint CSI subgroup contains the information of at least one of the following parameters:
 the selected SD basis subset indicator including, if configured, the rotation oversampling factors, and
 the SCI(s) for the RI layers,
and wherein a portion, or the entirety, of CSI part 2 is available for omission from the CSI report.

2. The method of claim 1, wherein the CSI subgroup that contains information associated with all $N_{REP}$ CSI reports has the highest priority (priority level 0), and the remaining $TN_{REP}$ CSI subgroups are associated with the lower priority levels 1 to $TN_{REP}$, and wherein the last CSI subgroup $TN_{REP}$ is associated with the lowest priority level $TN_{REP}$.

3. The method of claim 1, wherein, when omitting a CSI subgroup for a particular priority level, the UE omits all the CSI content at that priority level.

4. The method of claim 1, wherein the corresponding ordered bitmaps for the RI layers are grouped together to a bitmap of size 2UD×RI and segmented into D segments, wherein each segment has a size of 2U×RI, wherein the d-th segment is associated with the 2U SD components of all RI layers.

5. The method of claim 4, wherein the bits in a bit-segment associated with the same SD basis index of all layers are grouped together and sorted with respect to an increasing layer index, and wherein RI bits associated with a first SD basis index are grouped together and followed by RI bits associated with a second SD basis index, and so on.

6. The method of claim 1, wherein the ordering of the DD basis indices per layer according to the second ordering scheme is realized by the equation:

$$\pi(f) = \min(2 \cdot n_{3,l}^{(f)}, \ 2 \cdot (N_3 - n_{3,l}^{(f)}) - 1)$$

with l=1, 2, ..., v, and f=0, 1, ..., D−1, where $n_{3,l}^{(f)}$ is the f-th DD basis index out of D DD basis indices for each layer, and wherein v is the total number of layers.

7. The method of claim 1, wherein the ordering of the bits in the bitmap is realized by the equation:

$$Pri(l, i, f) = 2 \cdot U \cdot v \cdot \pi(f) + v \cdot i + l,$$

with $\pi(f) = \min(2 \cdot n_{3,l}^{(f)}, 2 \cdot (N_3 - n_{3,l}^{(f)}) - 1)$, with l=1, 2, ..., v, i=0, 1, ..., 2U−1, and f=0, 1, ..., D−1, where v is the total number of layers, U is the number of selected SD basis vectors per polarization and D is the number of DD basis indices.

8. The method of claim 1, wherein the CSI subgroup with highest priority contains:
 the v2LD−⌊$K_{NZ}$/2⌋ highest priority elements of the bitmap of RI=v layers, where $K_{NZ}$ is a number of non-zero coefficients indicated in the CSI report,
 the ⌈$K_{NZ}$/2⌉−v highest priority amplitude values, and
 the ⌈$K_{NZ}$/2⌉−v highest priority phase values.

9. The method of claim 1, wherein each CSI subgroup associated with a single CSI report contains the amplitude and phase information of the combining coefficients associated with a portion of the bitmaps of the RI layers.

10. The method of claim 1, wherein each CSI subgroup with the highest priority associated with a single CSI report contains at least the fraction of the bitmaps and the information of the combining coefficients associated with the DD basis vector index of the SCI for the RI layers.

11. The method of claim 8, wherein for the CSI subgroup with highest priority per CSI report, the $$\left(\left\lceil \frac{K_{NZ}}{2} \right\rceil - v\right) \times a$$

highest priority bits associated with the amplitude values are followed by the (⌈$K_{NZ}$/2⌉−v)×b highest priority bits associated with the phase values, and wherein v is the total number of transmission layers.

12. A method performed by a network node (gNB) for receiving channel state information (CSI) feedback in the form of one or more CSI reports in a wireless communication system (A), the method comprising:
 sending, to a user equipment (UE) higher layer configuration(s) of one or more downlink reference signals, and one or more CSI report configuration(s) associated with the downlink reference signal configuration(s), and a radio signal, the radio signal including the downlink reference signal(s) according to the one or more downlink reference signal configuration(s);
 receiving, from the UE one or more CSI reports for one or more CSI report configurations;

wherein the one or more CSI reports comprises:
a precoding matrix based on the downlink reference signal(s) and two codebooks, the two codebooks including
a spatial codebook comprising one or more spatial domain (SD) basis components of a precoder, and
a delay codebook comprising one or more delay domain (DD) basis components of the precoder,
and one or more non-zero combining coefficients for complex combining of the one or more SD and DD basis vectors,
wherein each CSI report contains a selected precoding matrix in the form of a precoding matrix identifier, PMI, and a rank identifier, RI, indicating the transmission rank for the RI layers of the precoding matrix, and wherein each CSI report comprises two parts: CSI part 1 and CSI part 2, wherein CSI part 1 has a fixed payload size and comprises information indicating the size of the payload of CSI part 2, wherein CSI part 2 comprises at least the amplitude and phase information of the selected non-zero combining coefficients of the CSI report, wherein a bitmap of each layer is segmented into D bit-sequences with respect to the DD basis indices of the selected DD basis vectors, wherein each bit-sequence comprises 2U×1 bits which are associated with 2U spatial beams, wherein U denotes the number of selected SD basis vectors from the spatial codebook, and each DD basis index is associated with a delay vector from the delay codebook and, wherein the D bit-sequences are ordered with respect to one of two ordering scheme for the $N_3$ DD basis indices, where $N_3$ denotes the number of DD basis indices of the delay codebook, where the $N_3$ DD basis indices are ordered as $$0, 1, N_3 - 1, 2, N_3 - 2, 3, N_3 - 3, 4, N_3 - 4, 5,$$

according to a first ordering scheme, or where the $N_3$ DD basis indices are ordered as $$0, N_3 - 1, 1, N_3 - 2, 2, N_3 - 3, 3, N_3 - 4, 4, N_3 - 5, 5,$$

according to a second ordering scheme, and wherein the ordering of the amplitude and phase information of the combining coefficients follows the ordering of the bit-sequences of the bitmaps of all RI layers, wherein CSI part 2 of the total number of ($N_{REP}$) CSI reports is segmented into $TN_{REP}+1$ CSI subgroups, where $TN_{REP}$ is a total number of CSI subgroups associated with the $N_{REP}$ CSI reports, wherein T CSI subgroups are associated with a single CSI report, and one CSI subgroup contains information associated with all $N_{REP}$ CSI reports, and wherein each CSI subgroup is associated with a priority (priority level), wherein the joint CSI subgroup associated with priority level 0 contains CSI information of all $N_{REP}$ CSI reports, and wherein the joint CSI subgroup contains the information of at least one of the following parameters:
the selected SD basis subset indicator including, if configured, the rotation oversampling factors, and
the SCI(s) for the RI layers,
and wherein a portion, or the entirety, of CSI part 2 is available for omission from the CSI report.

13. A user equipment (UE) comprising a processor and a memory, the memory containing computer program code executable by the processor whereby the UE is operative to:

receive, from a network node, gNB, higher layer configuration(s) of one or more downlink reference signals, and one or more CSI report configuration(s) associated with the downlink reference signal configuration(s), and a radio signal, the radio signal including the downlink reference signal(s) according to the one or more downlink reference signal configuration(s),
the downlink reference signal(s) being provided over a configured number of frequency domain resources, time domain resources and one or more ports;
determine, for each CSI report, a precoding matrix based on the downlink reference signal(s) and two codebooks, the two codebooks including
a spatial codebook comprising one or more spatial domain (SD) basis components of a precoder, and
a delay codebook comprising one or more delay domain (DD) basis components of the precoder,
and one or more non-zero combining coefficients for complex combining of the one or more SD and DD basis vectors; and
report, to the network node, the one or more CSI reports for the one or more CSI report configurations,
wherein each CSI report contains a selected precoding matrix in the form of a precoding matrix identifier, PMI, and a rank identifier, RI, indicating the transmission rank for the RI layers of the precoding matrix, and wherein each CSI report comprises two parts: CSI part 1 and CSI part 2, wherein CSI part 1 has a fixed payload size and comprises information indicating the size of the payload of CSI part 2, wherein CSI part 2 comprises at least the amplitude and phase information of the selected non-zero combining coefficients and bitmaps of all RI layers indicating the non-zero combining coefficients of the CSI report, wherein the bitmap of each layer is segmented into D bit-sequences with respect to the DD basis indices of the selected DD basis vectors, wherein each bit-sequence comprises 2U×1 bits which are associated with 2U spatial beams, wherein U denotes the number of selected SD basis vectors from the spatial codebook, and each DD basis index is associated with a delay vector from the delay codebook and, wherein the D bit-sequences are ordered with respect to one of two ordering scheme for the $N_3$ DD basis indices, where $N_3$ denotes the number of DD basis indices of the delay codebook, where the $N_3$ DD basis indices are ordered as $$0, 1, N_3 - 1, 2, N_3 - 2, 3, N_3 - 3, 4, N_3 - 4, 5,$$

according to a first ordering scheme, or where the $N_3$ DD basis indices are ordered as $$0, N_3 - 1, 1, N_3 - 2, 2, N_3 - 3, 3, N_3 - 4, 4, N_3 - 5, 5,$$

according to a second ordering scheme, and wherein the ordering of the amplitude and phase information of the combining coefficients follows the ordering of the bit-sequences of the bitmaps of all RI layers, wherein CSI part 2 of the total number of ($N_{REP}$) CSI reports is segmented into $TN_{REP}+1$ CSI subgroups, where $TN_{REP}$ is a total number of CSI subgroups associated with the $N_{REP}$ CSI reports, wherein T CSI subgroups are associated with a single CSI report, and one CSI subgroup contains information associated with all $N_{REP}$ CSI reports, and wherein each CSI subgroup is associated with a priority (priority level), wherein the joint CSI subgroup associated with priority level 0 contains CSI information of all $N_{REP}$ CSI reports, and wherein the joint CSI subgroup contains the information of at least one of the following parameters:

the selected SD basis subset indicator including, if configured, the rotation oversampling factors, and the SCI(s) for the RI layers, and wherein a portion, or the entirety, of CSI part 2 is available for omission from the CSI report.

14. A network node comprising a processor and a memory, the memory containing computer program code executable by the processor whereby the network node is operative to:

send, to a user equipment (UE) higher layer configuration(s) of one or more downlink reference signals, and one or more CSI report configuration(s) associated with the downlink reference signal configuration(s), and a radio signal, the radio signal including the downlink reference signal(s) according to the one or more downlink reference signal configuration(s); and receive, from the UE one or more CSI reports for one or more CSI report configurations;

wherein the one or more CSI reports comprises:

a precoding matrix based on the downlink reference signal(s) and two codebooks, the two codebooks including:

a spatial codebook comprising one or more spatial domain (SD) basis components of a precoder, and a delay codebook comprising one or more delay domain (DD) basis components of the precoder, and one or more non-zero combining coefficients for complex combining of the one or more SD and DD basis vectors, wherein each CSI report contains a selected precoding matrix in the form of a precoding matrix identifier, PMI, and a rank identifier, RI, indicating the transmission rank for the RI layers of the precoding matrix, and wherein each CSI report comprises two parts: CSI part 1 and CSI part 2, wherein CSI part 1 has a fixed payload size and comprises information indicating the size of the payload of CSI part 2, wherein CSI part 2 comprises at least the amplitude and phase information of the selected non-zero combining coefficients of the CSI report, wherein a bitmap of each layer is segmented into D bit-sequences with respect to the DD basis indices of the selected DD basis vectors, wherein each bit-sequence comprises 2U×1 bits which are associated with 2U spatial beams, wherein U denotes the number of selected SD basis vectors from the spatial codebook, and each DD basis index is associated with a delay vector from the delay codebook and, wherein the D bit-sequences are ordered with respect to one of two ordering scheme for the $N_3$ DD basis indices, where $N_3$ denotes the number of DD basis indices of the delay codebook, where the $N_3$ DD basis indices are ordered as $$0, 1, N_3 - 1, 2, N_3 - 2, 3, N_3 - 3, 4, N_3 - 4, 5,$$

according to a first ordering scheme, or where the $N_3$ DD basis indices are ordered as $$0, N_3 - 1, 1, N_3 - 2, 2, N_3 - 3, 3, N_3 - 4, 4, N_3 - 5, 5,$$

according to a second ordering scheme, and wherein the ordering of the amplitude and phase information of the combining coefficients follows the ordering of the bit-sequences of the bitmaps of all RI layers, wherein CSI part 2 of the total number of ($N_{REP}$) CSI reports is segmented into $TN_{REP}+1$ CSI subgroups, where $TN_{REP}$ is a total number of CSI subgroups associated with the $N_{REP}$ CSI reports, wherein T CSI subgroups are associated with a single CSI report, and one CSI subgroup contains information associated with all $N_{REP}$ CSI reports, and wherein each CSI subgroup is associated with a priority (priority level), wherein the joint CSI subgroup associated with priority level 0 contains CSI information of all $N_{REP}$ CSI reports, and wherein the joint CSI subgroup contains the information of at least one of the following parameters:

the selected SD basis subset indicator including, if configured, the rotation oversampling factors, and the SCI(s) for the RI layers, and wherein a portion, or the entirety, of CSI part 2 is available for omission from the CSI report.

* * * * *